US008861952B2

(12) United States Patent
Cole et al.

(10) Patent No.: US 8,861,952 B2
(45) Date of Patent: Oct. 14, 2014

(54) REDUNDANCY AND INTEROPERABILITY IN MULTI-CHANNEL OPTOELECTRONIC DEVICES

(75) Inventors: Christopher R. Cole, Redwood City, CA (US); Lewis B. Aronson, Los Altos, CA (US); Darin James Douma, Monrovia, CA (US)

(73) Assignee: Finisar Corporation, Sunnyvale, CA (US)

( * ) Notice: Subject to any disclaimer, the term of this patent is extended or adjusted under 35 U.S.C. 154(b) by 1511 days.

(21) Appl. No.: 12/039,589

(22) Filed: Feb. 28, 2008

(65) Prior Publication Data

US 2009/0060520 A1 Mar. 5, 2009

Related U.S. Application Data

(60) Provisional application No. 60/892,112, filed on Feb. 28, 2007, provisional application No. 60/892,181, filed on Feb. 28, 2007.

(51) Int. Cl.
*H04B 10/00* (2013.01)
*H04B 10/032* (2013.01)
*H04J 14/02* (2006.01)

(52) U.S. Cl.
CPC ............ *H04B 10/032* (2013.01); *H04J 14/02* (2013.01)
USPC ......... 398/5; 398/30; 398/31; 398/32; 398/33

(58) Field of Classification Search
USPC ................................................ 398/30–33, 5
See application file for complete search history.

(56) References Cited

U.S. PATENT DOCUMENTS

| 4,393,493 | A | * | 7/1983 | Edwards ...................... 370/228 |
| 4,994,675 | A | * | 2/1991 | Levin et al. .................. 250/551 |
| 5,069,521 | A | * | 12/1991 | Hardwick ...................... 385/24 |
| 5,121,244 | A | * | 6/1992 | Takasaki ....................... 398/14 |

(Continued)

FOREIGN PATENT DOCUMENTS

| JP | 11-194238 A | 7/1999 |
| JP | 2006-114684 A | 4/2006 |

(Continued)

OTHER PUBLICATIONS

U.S. Appl. No. 12/039,595, filed Feb. 28, 2008, Cole, et al.

(Continued)

*Primary Examiner* — Danny Leung
(74) *Attorney, Agent, or Firm* — Maschoff Brennan

(57) ABSTRACT

A multi-channel optoelectronic device is configured to establish a redundant status link with a remote device. The optoelectronic device can transmit N transmit optical signals to the remote device over a plurality of transmit channels and receive N receive optical signals from the remote device over a plurality of receive channels. The optoelectronic device includes one or more spare transmit and receive channels. When used with a remote device having spare transmit and receive channels, each device can establish a status link with the other and use the status link to switch out transmit and/or receive channels to identify and permanently switch out the worst transmit and/or receive channels. Alternately, the device can interoperate with a non-status-link enabled remote device by determining that the remote device is not status-link enabled, transitioning to a low transmit power mode, and transmitting and receiving over a plurality of default transmit and receive channels.

14 Claims, 13 Drawing Sheets

(56) References Cited

U.S. PATENT DOCUMENTS

| | | | |
|---|---|---|---|
| 5,122,892 A * | 6/1992 | Cloonan et al. | 398/55 |
| 5,216,666 A * | 6/1993 | Stalick | 370/222 |
| 5,299,293 A * | 3/1994 | Mestdagh et al. | 398/24 |
| 5,313,456 A * | 5/1994 | Sugawara | 370/228 |
| 5,475,676 A * | 12/1995 | Takatori et al. | 370/217 |
| 5,515,361 A * | 5/1996 | Li et al. | 370/222 |
| 5,708,753 A * | 1/1998 | Frigo et al. | 385/147 |
| 5,995,256 A * | 11/1999 | Fee | 398/34 |
| 6,005,694 A | 12/1999 | Liu | 398/6 |
| 6,081,359 A * | 6/2000 | Takehana et al. | 398/1 |
| 6,295,272 B1 | 9/2001 | Feldman et al. | 370/210 |
| 6,359,713 B1 * | 3/2002 | DeCusatis et al. | 398/178 |
| 6,366,373 B1 * | 4/2002 | MacKinnon et al. | 398/31 |
| 6,483,616 B1 * | 11/2002 | Maddocks et al. | 398/1 |
| 6,897,424 B2 | 5/2005 | Suzuki et al. | |
| 6,915,075 B1 * | 7/2005 | Oberg et al. | 398/9 |
| 6,931,183 B2 * | 8/2005 | Panak et al. | 385/101 |
| 6,965,735 B2 * | 11/2005 | Wu et al. | 398/12 |
| 7,046,928 B1 * | 5/2006 | Bradford et al. | 398/9 |
| 7,099,578 B1 | 8/2006 | Gerstel | 398/5 |
| 7,212,739 B2 * | 5/2007 | Graves et al. | 398/5 |
| 7,242,860 B2 * | 7/2007 | Ikeda et al. | 398/5 |
| 7,302,190 B2 * | 11/2007 | Goto et al. | 398/182 |
| 7,359,639 B2 * | 4/2008 | Wolcott et al. | 398/115 |
| 7,389,045 B2 * | 6/2008 | Fee | 398/33 |
| 7,421,197 B2 * | 9/2008 | Palacharla et al. | 398/5 |
| 7,426,346 B2 * | 9/2008 | Wang et al. | 398/5 |
| 7,536,101 B1 * | 5/2009 | Jones et al. | 398/5 |
| 7,546,034 B2 * | 6/2009 | Mueller | 398/5 |
| 7,551,852 B2 * | 6/2009 | Reintjes et al. | 398/33 |
| 7,577,358 B2 * | 8/2009 | Barbosa et al. | 398/54 |
| 7,613,392 B2 * | 11/2009 | Gerstel | 398/5 |
| 7,684,703 B2 * | 3/2010 | Harada | 398/68 |
| 7,801,442 B2 * | 9/2010 | Wang et al. | 398/5 |
| 7,805,072 B2 * | 9/2010 | Lovisa et al. | 398/4 |
| 7,826,745 B2 * | 11/2010 | DeCusatis et al. | 398/75 |
| 2002/0012142 A1 * | 1/2002 | Gautheron et al. | 359/124 |
| 2002/0030865 A1 * | 3/2002 | Kawate et al. | 359/110 |
| 2002/0114038 A1 * | 8/2002 | Arnon et al. | 359/145 |
| 2003/0002109 A1 | 1/2003 | Hochberg et al. | |
| 2003/0025957 A1 * | 2/2003 | Jayakumar | 359/110 |
| 2003/0095303 A1 * | 5/2003 | Cunningham et al. | 359/110 |
| 2003/0133712 A1 * | 7/2003 | Arikawa et al. | 398/2 |
| 2004/0008988 A1 * | 1/2004 | Gerstal et al. | 398/45 |
| 2004/0257642 A1 * | 12/2004 | Fishman et al. | 359/341.3 |
| 2006/0018659 A1 * | 1/2006 | Sekine et al. | 398/79 |
| 2006/0153503 A1 * | 7/2006 | Suzuki et al. | 385/53 |
| 2006/0182445 A1 * | 8/2006 | Lee et al. | 398/72 |
| 2006/0285847 A1 * | 12/2006 | McCall et al. | 398/73 |
| 2009/0060520 A1 * | 3/2009 | Cole et al. | 398/140 |

FOREIGN PATENT DOCUMENTS

| | | |
|---|---|---|
| KR | 20-0180217 Y1 | 5/2000 |
| KR | 20-0309948 Y1 | 3/2003 |
| KR | 20-0399085 Y1 | 9/2005 |

OTHER PUBLICATIONS

U.S. Appl. No. 12/112,214, filed Apr. 30, 2008, Cole, et al.

Joiner, Steve, "Open Fiber Control for Parallel Optics," Hewlett Packard, Communication Semiconductor Solutions Division, Mar. 27, 1997.

U.S. Appl. No. 12/039,595 Notice of Allowance mailed May 25, 2011.

U.S. Appl. No. 12/039,595 Non Final Office Action mailed Jan. 6, 2011.

U.S. Appl. No. 12/112,214 Non Final Office Action mailed Mar. 3, 2011.

U.S. Appl. No. 12/112,214, filed Sep. 19, 2011, Office Action.

* cited by examiner

REDUNDANCY AND INTEROPERABILITY IN MULTI-CHANNEL OPTOELECTRONIC DEVICES

CROSS-REFERENCE TO RELATED APPLICATIONS

This application claims the benefit of U.S. Provisional Patent Application Ser. No. 60/892,112, filed Feb. 28, 2007 entitled PROVIDING AUTOMATIC REDUNDANCY IN MULTI-CHANNEL OPTICAL COMMUNICATION SYSTEMS and U.S. Provisional Patent Application Ser. No. 60/892,181, filed Feb. 28, 2007 entitled INTEROPERABILITY OF OPTICAL TRANSCEIVERS WITH AND WITHOUT STATUS LINK FUNCTIONALITY. Both of the foregoing applications are herein incorporated by reference in their entirety.

BACKGROUND OF THE INVENTION

1. The Field of the Invention

The present invention relates generally to systems, methods and devices for multi-channel high speed data transmission. More particularly, embodiments of the invention concern systems, methods, and devices for providing automatic redundancy and interoperability of multi-channel optoelectronic devices.

2. The Relevant Technology

Computing and networking technology have transformed our world. As the amount of information communicated over networks has increased, high speed transmission has become ever more critical. Many high speed data transmission networks rely on optoelectronic devices for facilitating transmission and reception of digital data embodied in the form of optical signals over optical fibers. Optical networks are thus found in a wide variety of high speed applications ranging from modest Local Area Networks (LANs) to backbones that define a large portion of the infrastructure of the Internet.

Typically, data communication in such networks is implemented by way of an optoelectronic device, such as a transceiver or transponder, that includes an optical transmitter for optical data transmission and an optical receiver for optical data reception. As demands for higher data transmission speeds between points in optical networks have increased, optoelectronic devices have been developed with multiple optical transmitters and multiple optical receivers to transmit and receive optical signals over multiple signal channels. These multi-channel optoelectronic devices often utilize one of several different types of signal channels, such as multiple ribbon fibers, multiple wavelengths or in-phase and quadrature-phase channels. Every signal channel requires its own transmitter and receiver. To support N duplex channels, a multi-channel optoelectronic device therefore requires at least N transmitters and at least N receivers.

In order to efficiently manufacture multi-channel optoelectronic devices, it is often desirable to manufacture identical components in array configurations. For example, N transmitters or N receivers might be manufactured in an array configuration for use in a multi-channel optoelectronic device. In particular, multi-channel optoelectronic devices implementing parallel optics (requiring multiple ribbon fibers) often use N vertical cavity surface emitting lasers (VCSELs) manufactured as an array to transmit N optical signals. One faulty element in such an array can render the entire array (and a corresponding multi-channel optoelectronic device that includes the array) virtually useless. This can be particularly problematic when there is a substantial likelihood of one or more elements of the array being faulty at the time of manufacture. Even when every element is functional at the time of manufacture, differences in composition and operating and/or environmental conditions can cause individual elements of an array to fail at different times. Clearly, such arrays provide zero failure tolerance.

Additionally, it is often desirable in optical networks to implement a status link between optoelectronic devices, whether the devices are multi-channel or single-channel. The status link can be used to provide information to the devices about each device and/or the physical link between the devices. Conventional status links are often implemented by signaling between optoelectronic devices over spare fibers and/or by superimposing the status link out-of-band (OOB) on a single signal channel. These schemes require additional components and/or are subject to the same failure modes as the signal channel.

Further, the establishment of a status link requires that both optoelectronic devices have means for establishing the status link. In other words, the hardware has to be the same at both ends. However, optical networks may implement optoelectronic devices from multiple vendors. Consequently, it would be desirable for status-linkable optoelectronic devices to be compatible with non-status-linkable optoelectronic devices.

The subject matter claimed herein is not limited to embodiments that solve any disadvantages or that operate only in environments such as those described above. Rather, this background is only provided to illustrate one example technology area where some embodiments described herein may be practiced

BRIEF SUMMARY OF THE INVENTION

Embodiments of the present invention are directed to systems and methods for communicating status information over a multi-channel communication link. In particular, embodiments of the invention enable the use of two or more signal channels to simultaneously convey a status link with two or more main communication links. In this manner, each end of the multi-channel communication link can obtain information about the other end of the link, which permits functions to improve the quality of the main communication, including switching out spare channels. Advantageously, redundantly conveying the status data over two or more of the main communication links provides a high failure tolerance in the event that one or more of the main communication links is impaired.

One embodiment of the invention includes an optoelectronic device configured to establish and detect status links with a status-link enabled remote device. The optoelectronic device includes a plurality of optical transmitters, a plurality of optical receivers, and a controller configured to effectively modulate transmitter bias currents for at least two of the optical transmitters with first status data to establish a status link with the remote device and further configured to detect second status data from a status link established by the remote device with the optoelectronic device. The optoelectronic device may include spare transmitters and/or receivers and is further configured to interoperate with a remote device that is not status-link enabled. Alternately or additionally, the optoelectronic device with spare channels can use the status link for automatic redundancy when used with a remote device that also includes spare channels.

One embodiment of a method for providing automatic redundancy in a multi-channel optoelectronic device with active channels and spare channels includes establishing a status link over at least two active transmit channels with a remote device. The optoelectronic device switches out one or more of the active channels such that the switched out channel becomes a spare channel and one or more of the spare channels becomes an active channel. The optoelectronic device identifies the switched out channel to the remote device over the status link and the remote device switches out a corresponding active channel. One or both of the devices can measure and store digital bias current values for the active and spare channels before and after the switching out to identify the worst channels, which can be switched out permanently during operation. Advantageously, the method for providing automatic redundancy optimizes the active channels and provides channel failure tolerance in multi-channel communication links. Additionally, the availability of spare channels permits failed or impaired channels to be switched out.

One embodiment of a method for interoperating a status-link enabled optoelectronic device with a non-status-link enabled remote device can be performed using a status-link enabled multi-channel optoelectronic device that includes a plurality of default transmit channels and one or more spare transmit channels. In one embodiment, the method includes determining that the remote device is not status-link enabled, transitioning to or maintaining operation in a low transmit power mode, and establishing a plurality of main communication links with the remote device on the plurality of default transmit channels.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with transmitting and receiving status data between optoelectronic devices. More particularly, embodiments of the invention enable the redundant transmission and receipt of status data over multiple signal channels. The status data can be used, for instance, to enable automatic redundancy in multi-channel optoelectronic devices and/or to enable interoperability of status-link enabled optoelectronic devices with non-status-link enabled optoelectronic devices. Embodiments of the invention can apply to optical communication links and/or optoelectronic devices implementing various multi-channel transmission techniques, including wavelength division multiplexing (WDM), parallel optics and in-phase and quadrature-phase (I and Q) channels.

Figure 1:
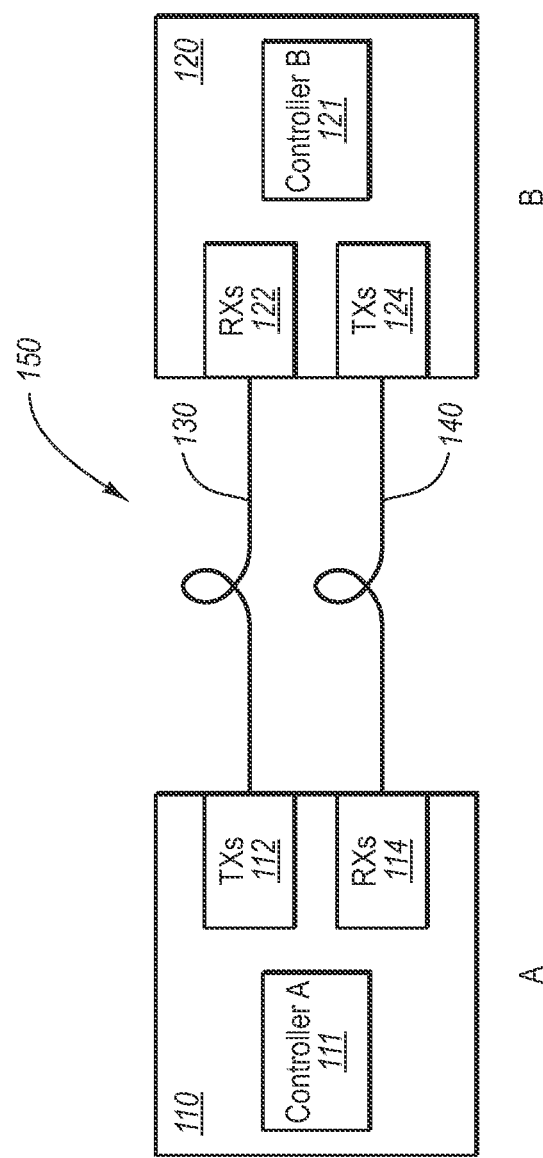
FIG. 1 schematically illustrates an example operating environment in which embodiments of the invention can be implemented.

FIG. 1 illustrates an example optical communication link 150 in which embodiments of the present invention may be implemented. The link 150 includes an optoelectronic device 110 at point A (e.g., device A) and an optoelectronic device 120 at point B (e.g., device B). Device A 110 is status-link enabled, meaning it is capable of establishing a status link with another optoelectronic device. The process of establishing a status link is described more fully below. Device A 110 includes a controller 111, a plurality of transmitters 112 for communicating over an A-to-B set of N signal channels via optical fiber(s) 130, and a plurality of receivers 114 for communicating over a B-to-A set of N signal channels via optical fiber(s) 140. Device A may include N transmitters and N receivers. Alternately or additionally, Device A may include more than N transmitters and more than N receivers to provide redundancy.

Device B 120 similarly includes a plurality of receivers 122 for communicating over the A-to-B set of N signal channels and a plurality of transmitters 124 for communicating over the B-to-A set of N signal channels. Additionally, device B 120 may include N transmitters and N receivers or more than N transmitters and more than N receivers for redundancy. In one embodiment, device B 120 is status-link enabled, while in another embodiment device 120 is not status-link enabled. Device B 120 may optionally include a microcontroller 121.

In the A-to-B direction of the link 150, device A 110 can receive N electrical input signals from a first host (not shown), convert them to optical signals, and transmit the N optical signals over fiber optic cable(s) 130 to device B 120 where device B 120 converts them to N electrical output signals for a second host (not shown). Similarly, in the B-to-A direction, device B 120 can receive N electrical input signals from the second host, convert them to optical signals and transmit the N optical signals over fiber optic cable(s) 140 to device A 110 where device A 110 converts them to N electrical output signals for the first host. If the link 150 implements parallel optics, every optical signal is transmitted over a separate physical channel (e.g., a separate fiber) and fiber optic cables 130 and 140 may individually or jointly comprise one or more parallel ribbon fiber bundles. If the link 150 implements WDM, each optical signal is transmitted over a separate wavelength channel and the optical signals in each direction may be optically multiplexed onto a fiber optic cable 130 or 140 (or onto a single bidirectional fiber optic cable).

According to embodiments of the invention, status data indicating the status of the communication channels between device A 110 and device B 120 may be transmitted between devices A and B if both devices are status-link enabled. The status data may be conveyed by itself or simultaneously with primary data without impairing or degrading the quality or speed of transmission of the primary data. As used herein, the term "primary data" comprises data such as customer data, voice data or computer data that does not control or provide information regarding the operation or status of a multi-channel point-to-point communication system. Primary data is conveyed over one or more main communication links or communication channels. "Status data," "status information" and variations thereof are interchangeable terms that refer to data other than primary data, that provides information regarding or controls the operation or status of a multi-channel point-to-point communication system. Status data is conveyed over a status link and can be used to improve the quality of the main communication links.

The optical communication link 150 of FIG. 1 illustrates one system architecture in which embodiments of the invention can be implemented. More generally, however, embodiments of the present invention can be implemented in any system architecture in which data is transmitted and received between optoelectronic devices. As used herein, the term "optoelectronic device" includes devices having both optical and electrical components. Examples of optoelectronic devices include, but are not limited to transponders, transceivers, transmitters, and/or receivers. Optoelectronic devices can exemplarily be used in telecommunications networks, local area networks, metro area networks, storage area networks, wide area networks, and the like. The principles of the present invention may be implemented in optoelectronic devices of any form factor currently available or that may be developed in the future for 10 G, 40 G, 50 G or 100 G signaling, without restriction. It will be appreciated, however, that the optoelectronic devices need not comply with standardized form factor requirements and may have any size or configuration necessary according to a particular design. The principles of the present invention are suitable for use with, for example, 10 G, 40 G, 50 G, 100 G and higher transmission speeds.

Returning to FIG. 1, when device B 120 is status-link enabled, controller A 111 establishes a redundant status link with controller B 121 ("A-to-B status link") by effectively modulating the transmitter bias currents for two or more of the plurality of transmitters 112 of device A with a low frequency status link modulation signal representative of status data generated by controller A. Similarly, controller B 121 establishes a redundant status link with controller A ("B-to-A status link") by modulating the transmitter bias currents for two or more of the plurality of transmitters 122 of device B with a low frequency status link modulation signal representative of status data generated by controller B. In this manner, each controller establishes a redundant status link with the other over two or more channels. The controllers use the redundant status links to convey status data to each other, and the status data may be used to optimize the performance of the optical link 150. For instance, when both of devices A and B include redundant transmitters and/or receivers, the status data can be used to switch out a non-functional signal channel for a functional one.

Figure 2:
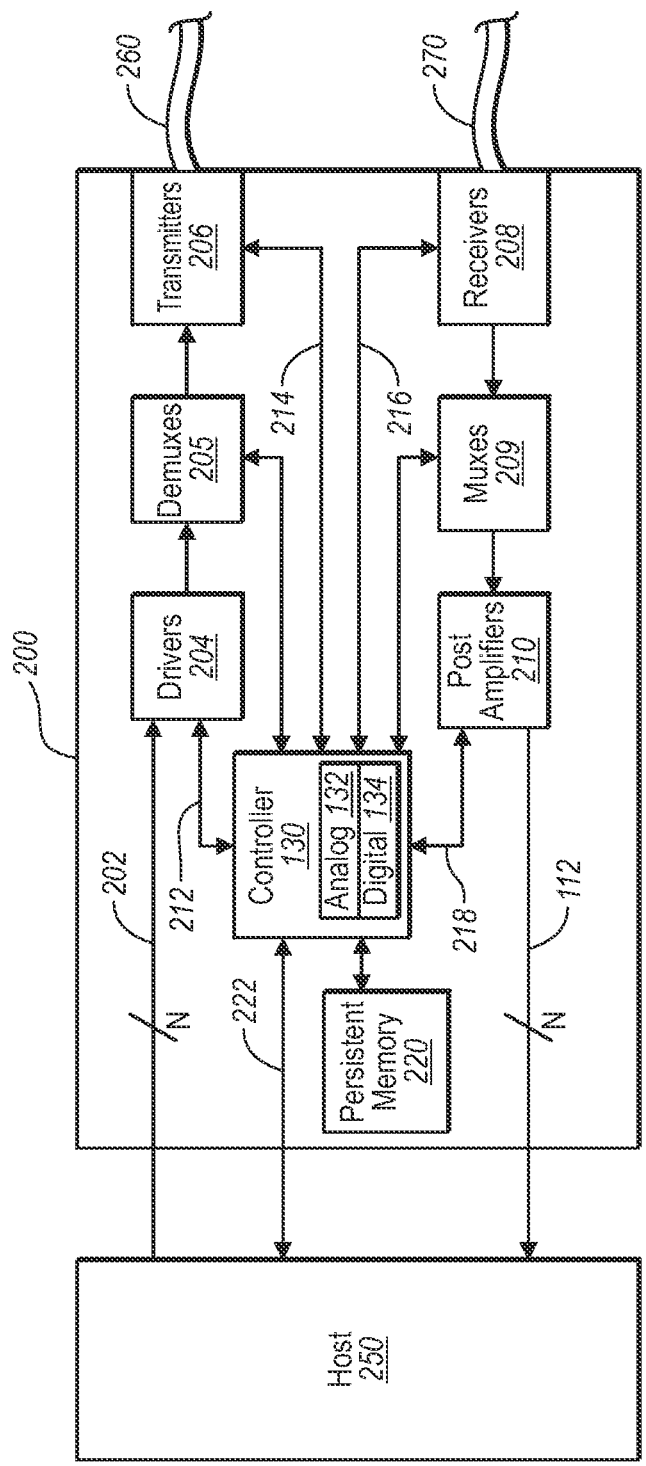
FIG. 2 schematically illustrates an example optoelectronic device that may implement features of the present invention and can be implemented in the environment of FIG. 1.

With additional reference to FIG. 2, a simplified block diagram of an example multi-channel optoelectronic device 200 is illustrated. The device 200 may comprise, for instance, a multi-channel transponder or transceiver, and corresponds in one embodiment to the devices 110 and/or 120 of FIG. 1. FIG. 2 further depicts the interaction between the device 200, a host 250 and fiber optic cables 260, 270. The multi-channel optoelectronic device 200 implements parallel optics to transmit N primary data channels and to receive N primary data channels over parallel ribbon fibers 260, 270, respectively.

According to one embodiment of the invention, N is greater than one and less than the total number of available signal channels, M. M and N are related by the equation $M=N+S$, where S represents the number of spare channel(s) in a multi-channel communication link. The N channels in use or configured to be in use at any given time to transmit primary data may also be referred to herein as "active" channels. Furthermore, the adjective "active" may be applied to components at either end of an active channel to indicate that the components are in or are configured to be in actual use, facilitating signal transmission on the active channel. In contrast, channels and/or components not in or not presently configured to be in actual use are referred to herein as "inactive," "spare," or "redundant" channels and/or components.

While the optoelectronic device 200 and related components (e.g., host, fiber optic cables, etc.) will be described in some detail, they are described by way of illustration only, and not by way of restricting the scope of the invention. In particular, some of the components used to facilitate one type of multi-channel transmission technique may or may not be necessary in another type of multi-channel transmission technique. For instance, in the present embodiment, the fiber optic cables 260, 270 may each comprise MPO 12 fiber patch cord, and the optoelectronic device 200 may be configured to send and receive anywhere from two to eleven data signals over the fiber patch cord, with each fiber carrying no more than one data signal. In another embodiment in which WDM is implemented, however, one fiber optic cable carries multiple data signals, in which case as few as one single mode fiber (SMF) or multimode fiber (MMF) may be used for each of the fiber optic cables 260, 270.

During operation, the multi-channel optoelectronic device 200 can receive N data-carrying electrical signals or channels 202 from the host 250, which can be any computing system capable of communicating with the multi-channel optoelectronic device 200, for transmission as N data-carrying optical signals on to the parallel fibers 260. The N electrical signals may each comprise primary data. Each electrical signal is provided to one of N laser drivers 204, although there may be more than N laser drivers in some embodiments for redundancy. A driver 204 receiving an electrical data signal provides a primary data modulation signal to a corresponding optical transmitter 206, driving the transmitter to emit onto one of the fibers 260 a data-carrying optical signal representative of the information carried on the electrical data signal.

In some embodiments, the device 200 may include N optical transmitters, while in other embodiments the device 200 includes M optical transmitters, with S spare optical transmitters for redundancy. Each of the optical transmitters 206 may comprise a light source having any suitable configuration, including, but not limited to, a distributed feedback (DFB) laser, a vertical cavity surface emitting laser (VCSEL), a cooled or uncooled externally modulated laser (EML), an EML with a wavelocker, a Fabry-Perot laser, an LED, and the like. In the present embodiment, the plurality of optical transmitters 206 comprises an array of VCSELs fabricated as a single semiconductor component, although other arrangements, light sources, and materials may also be used.

When the number M of optical transmitters 206 (and optionally drivers 204) is greater than the number N of signal channels, S transmitters will be unused and the primary data modulation signals must be routed to only N of the M available transmitters. For this reason, the optoelectronic device 200 may include a plurality of de-multiplexers (or demuxes) 205 coupled between the N incoming signals 202 and the M optical transmitters 206.

As illustrated, there are N drivers 204 and the N demuxes 205 are positioned after the drivers. Alternately or additionally, there may be M drivers 204 for redundancy, in which case the N demuxes 205 would be positioned before the drivers 204. The N demuxes 205 may be (S+1):1 demuxes, described in more detail with respect to FIGS. 4-6. In the illustrated embodiment, each demux receives a primary data modulation signal and routes it to one of (S+1) transmitters. In one embodiment, the demuxes are integrated on a single chip with the drivers. Alternately, they may be manufactured on individual chips. As previously mentioned, although the N demuxes are illustrated in between the N drivers and the M transmitters, they could also be placed before the drivers (which would require S additional drivers) or at various other points of the transmit path, with any failed component after the demux output available to be switched out.

The multi-channel optoelectronic device 200 is also configured to receive N data-carrying optical signals from parallel ribbon fibers 270 using N active out of M available optical receivers 208. Each of the optical receivers 208 may comprise for example, a photodetector, a photodiode, an avalanche photodiode (APD), a positive-intrinsic-negative photodiode (PIN), and the like. In the present embodiment, the M receivers 208 comprise an array of M PINs fabricated on a single piece of Indium Phosphide, although other arrangements, receivers and materials may also be used.

The optical receivers 208 receive and transform the N optical signals into N electrical signals. The post-amplifiers 210 amplify each electrical signal and provide N amplified signals 212 to the host 250. In other words, the multi-channel transceiver can receive N optical signals, transform every one into an electrical signal, amplify each signal, and provide N amplified electrical signals representative of the N received optical signals to the host. The N received signals typically comprise primary data.

As previously discussed, the optoelectronic device 200 may transmit N optical signals over N active transmit channels out of M available transmit channels. Similarly, the device 200 may receive N optical signals over N active receive channels out of M available receive channels. When the number M of optical receivers 208 (and optionally post-amplifiers 210) is greater than the number N of received optical signals, S optical receivers will be unused. For this reason, the device 200 may include a plurality of multiplexers (or muxes) 209 coupled between optical receivers 208 and the host 250.

As illustrated, there are N post-amplifiers 210 and the N muxes 209 are positioned before the post-amplifiers. Alternately, there may be M post-amplifiers 210 for redundancy, in which case the N muxes 209 would be positioned after the post-amplifiers 210. The N muxes 209 may be (S+1):1 muxes, described in more detail with respect to FIGS. 4-6. In the illustrated embodiment, each mux is configured to receive an electrical signal at any given time from only one of (S+1) available receivers and provide it to a post-amplifier. In one embodiment, the muxes are integrated on a single chip with the post-amplifiers. Alternately, they can be manufactured on individual chips. As previously indicated, although the N muxes are illustrated in between the M receivers and the N post-amplifiers, they could also be placed after the post-amplifiers (which would require S additional post-amplifiers) or at various other points of the receive path, with any failed component before the mux input available to be switched out.

The behavior of the drivers 204, transmitters 206, receivers 208 and post amplifiers 210 may vary dynamically due to a number of factors. For example, temperature changes, power fluctuations, feedback conditions, and aging effects may each affect the performance of these components. Accordingly, the optoelectronic device 200 further includes a controller 230, which can evaluate conditions pertinent to transceiver operation, such as temperature, voltage or bias current, and receive information from the drivers 204, transmitters 206, receivers 208 and post amplifiers 210, represented by arrows 212, 214, 216 and 218, respectively. This allows the controller 230 to optimize the dynamically varying performance, and additionally detect when there is a loss of signal. Specifically, the controller 230 may optimize the operation of the optoelectronic device 200 by adjusting settings on each of the drivers 204 and/or post amplifiers 210 individually. These settings adjustments can be intermittent and are generally only made when temperature or voltage or other low frequency changes so warrant. According to one embodiment, these adjustments may occur in response to status information received from a second optoelectronic device with which the first optoelectronic device 200 communicates.

In the present embodiment, the controller 230 communicates, as illustrated by the line 213, with each of the N demuxes 205 to control which of the M transmitters receive electrical signals. Similarly, the controller 230 communicates with each of the N muxes 209, as illustrated by the line 217, to control which of the M receivers supply electrical signals to the post-amplifiers 210. The controller may switch out a nonfunctional transmitter or receiver for a spare functional transmitter or receiver through the N demuxes 205 or N muxes 209.

The controller 230 may have access to a persistent memory 220, which in one embodiment, is an electrically erasable programmable read-only memory (EEPROM). Persistent memory 220 may also be any other nonvolatile memory source. The persistent memory 220 and the controller may be packaged together in the same package or in different packages without restriction. Data may be exchanged between the controller 230 and the host 250 using an appropriate interface 222, such as I$^2$C, MDIO, SPI, or the like without restriction. Although not required, in one embodiment, the controller 230 can include both an analog portion 232 and a digital portion 234 that together allow the controller to implement logic digitally, while still largely interfacing with the rest of the optoelectronic device 200 using analog signals.

The controller senses and retrieves data relating to the operation of the multi-channel optoelectronic device 200. In particular, the controller is configured to sense and retrieve data relating to each of the M available transmit channels and/or the M available receive channels of the device 200. For instance, the controller may retrieve digital values for the transmitter bias currents for each of the N active transmitters. The digital values for the N active transmitters may be supplied to N digital to analog converters (DACs) which use the digital values to generate analog transmitter bias currents for the N active transmitters. Alternately or additionally, the controller 230 may detect the receiver bias currents in the N active receivers.

In one embodiment, the controller enters a link establishment mode where it cycles through every transmitter and/or every receiver to sense the bias current in each. After comparing the sensed bias currents, the controller may identify and configure for use the N best transmitters and/or the N best receivers based on, for example, which transmitters have the lowest transmitter bias currents and/or which receivers have the highest receiver bias currents. In another embodiment, the N best transmitters and N best receivers may be selected based on one or more other criteria.

Figure 3:
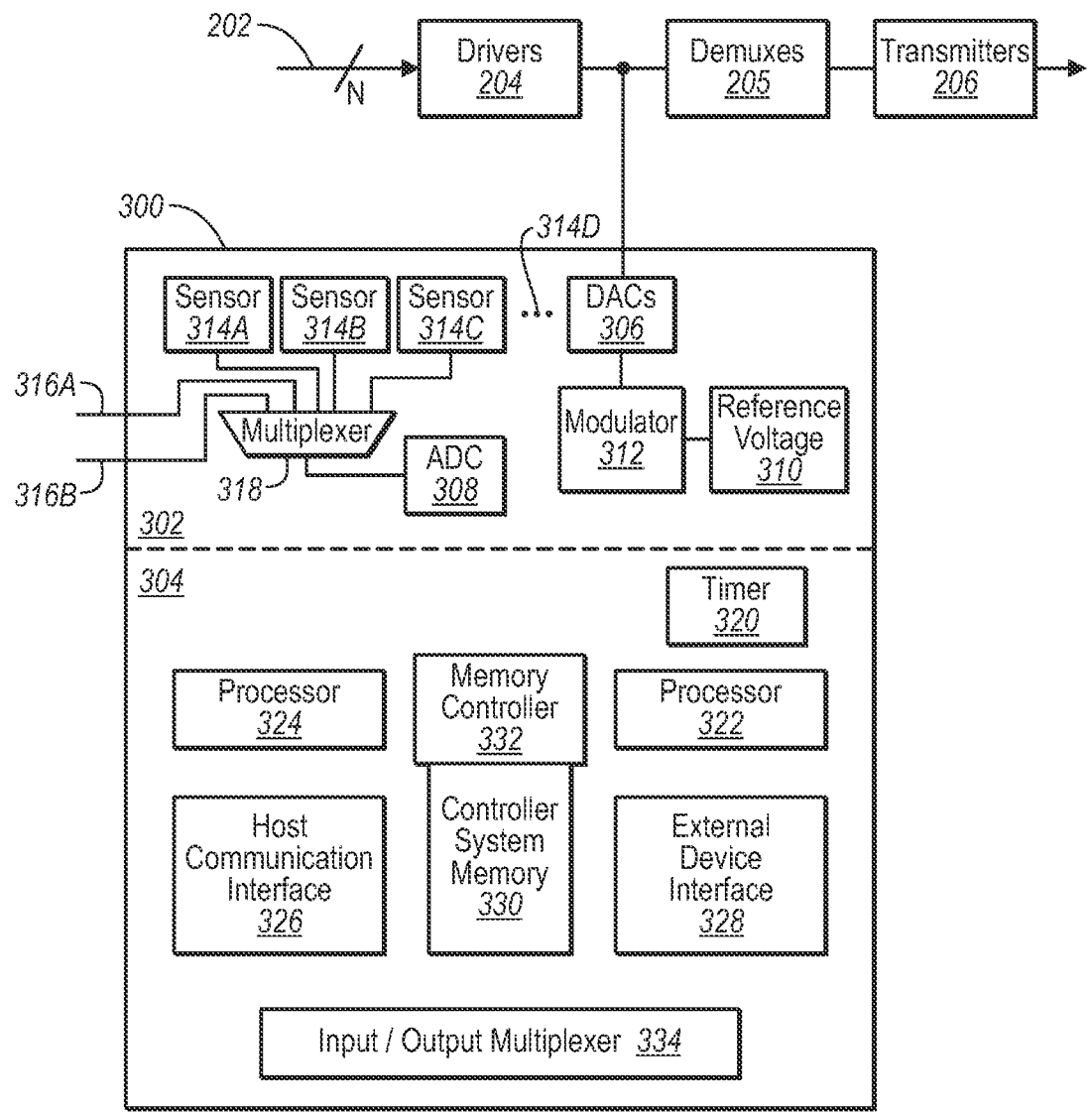
FIG. 3 schematically illustrates an example of a controller used in the transceiver of FIG. 1.

FIG. 3 schematically illustrates an example configuration 300 of the controllers 111, 121 of FIG. 1 and/or controller 230 of FIG. 2 in further detail. The controller 300 includes an analog portion 302 that represents an example of the analog portion 232 of FIG. 2, and a digital portion 304 that represents an example of the digital portion 234 of FIG. 2. For example, the analog portion 302 may contain DACs 306, analog to digital converters (ADCs) 308, high speed comparators (e.g., for event detection), voltage based reset generators, voltage regulators, voltage references 310, clock generator, modulator 312, and other analog components. The analog portion 302 may also include sensors 314A, 314B, 314C amongst potentially others as represented by the horizontal ellipses 314D. Each of these sensors may be responsible for measuring diagnostic data including environmental and/or operational parameters that may be measured from the control module 300 such as, for example supply voltage and device temperature. The control module may also receive external analog or digital signals from other components within the device 200. Two externals lines 316A and 316B are illustrated for receiving such external analog signals although there may be many of such lines. According to one embodiment of the invention, external lines like 316A and 316B can receive external analog signals from the M available receivers 208 representing the receiver bias current in each of the receivers.

The internal sensors 314A through 314D may generate analog signals that represent the measured values. In addition, the externally provided signals 316A, 316B may also be analog signals. In this case, the analog signals are converted to digital signals so as to be available to the digital portion 304 of the controller 300 for further processing. Each analog parameter value may have its own ADC. Alternately, each signal may be periodically sampled in a round robin fashion using a single ADC such as the illustrated ADC 308 to preserve chip space. In this case, each analog value may be provided to a multiplexer 318, which selects in a round robin fashion, one of the analog signals at a time for sampling by the ADC 308. Alternatively, multiplexer 318 may be programmed to allow for any order of analog signals to be sampled by the ADC 308.

The digital portion 304 of the control module 300 may include a timer module 320 that provides various timing signals used by the digital portion 304. Such timing signals may include, for example, programmable processor times. The timer module 320 may also act as a watchdog timer. In one embodiment where the controller enters a link establishment mode, the timer limits the amount of time that the controller can spend in the link establishment mode.

Two general purpose processors 322 and 324 may also be included. Alternately, the controller 300 may include a single processor. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 322 and 324 are each a 16-bit processor and may be identically structured. The precise structure of the instruction set is not important to the principles of the present invention as the instruction set may be optimized around a particular hardware environment, and as the precise hardware environment is not important to the principles of the present invention.

A host communication interface 326 is used to communicate with the host 250 using, for example, serial data (SDA) and serial clock (SCL) lines of an I$^2$C interface, although other interfaces may be used as previously indicated. The external device interface 328 is used to communicate with other modules within the multi-channel optoelectronic device 200 such as the post-amplifiers 110, the laser drivers 104, or the persistent memory 120.

The internal controller system memory 330 (not to be confused with the external persistent memory 220) may be random access memory (RAM) or nonvolatile memory. While system memory 330 may be RAM, it may also be a processor, register, flip-flop or other memory device. The memory controller 332 shares access to the controller system memory 330 amongst each of the processors 324, 322 and with the host communication interface 326 and the external device interface 328.

An input/output multiplexer 334 multiplexes the various input/output pins of the controller 300 to the various components within the controller 300. This enables different components to dynamically assign pins in accordance with the then-existing operational circumstances of the controller 300. Accordingly, there may be more input/output nodes within the controller 300 than there are pins available on the controller 300, thereby reducing the footprint of the controller 300.

Figure 4:
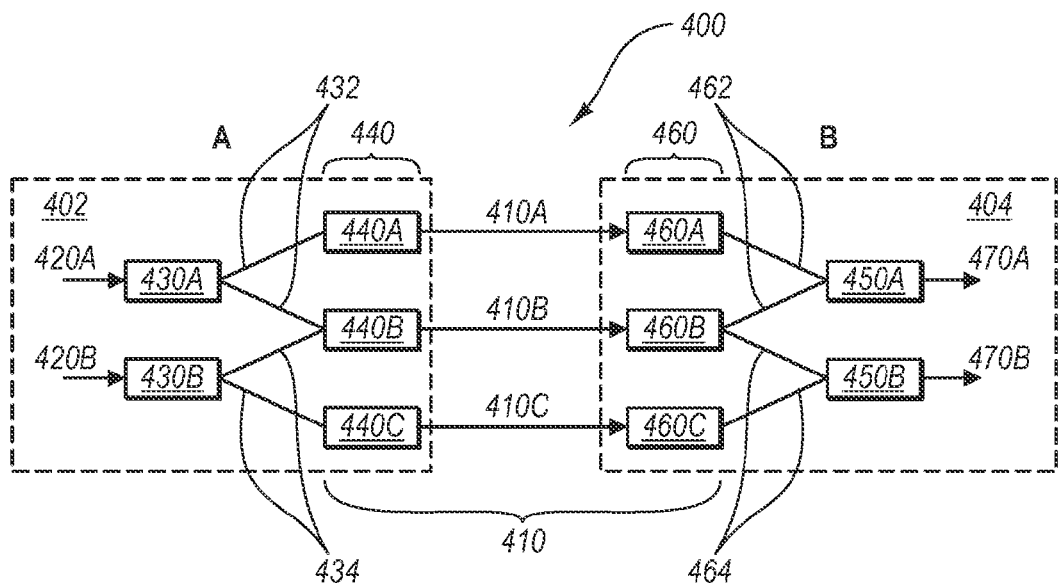
FIG. 4 depicts a basic multi-channel communication link having a failure tolerance of one channel.

With additional reference to FIG. 4, details are provided concerning a basic multi-channel communication link 400 having a failure tolerance of one (S) channel. The multi-channel communication link 400 comprises an optoelectronic device 402 at point A transmitting primary data to an optoelectronic device 404 at point B (e.g., the A-to-B direction), where optoelectronic device B 404 also transmits primary data to optoelectronic device A 402 (e.g., the B-to-A direction). Optoelectronic devices 402, 404 may correspond in one embodiment to optoelectronic devices 110, 120 of FIG. 1, respectively. However, FIG. 4 illustrates only the A-to-B direction.

The multi-channel communication link 400 can establish two (N) active communication channels in the A-to-B direction. However, the link 400 has three (M) available physical channels 410, each physical channel comprising a transmitter, a transmit path (such as an individual fiber for parallel optics or a distinct wavelength for WDM) and a receiver.

Device A 402 receives two (N) electrical data signals 420A, 420B as input and transmits two (N) optical data signals as output. The electrical data signals are provided to two (N) demuxes 430A, 430B, which route the signals to two of three (M) available transmitters 440A, 440B and 440C. According to embodiments of the invention, an electrical data signal 420A is received by a demux 430A, which routes the electrical signal to one of two (S+1) available transmitters 440A or 440B, the available routing paths including the lines 432. In a similar manner, the electrical signal received by the demux 430B is routed to one of two (S+1) available transmitters 440B or 440C, as indicated by the lines 434. By implementing two (N) 2:1 ((S+1): 1) demuxes before the three (e.g., M) transmitters 440, two signals may be routed to two active channels, leaving one (S) spare channel for switching.

If demux 430A routes its electrical signal to transmitter 440A, then demux 430B can route its electrical signal to either of transmitters 440B or 440C. However, if demux 430A routes its electrical signal to transmitter 440B, then demux 430B can only route its electrical signal to transmitter 440C. Transmitter 440A is configured to emit an optical signal onto available channel 410A, while transmitters 440B and 440C are configured to emit optical signals onto available channels 410B and 410C, respectively.

Optoelectronic device B 404 receives two (N) optical data signals as input from two (N) active channels of the three (M) available channels 410. The two optical signals are received by two (N) active of three (M) available receivers 460. The two (N) active receivers convert the optical signals to electrical signals. Device A 402 and device B 404 establish a status link, described in more detail below, whereby device B is aware of which two (N) of the three (M) available channels are active. Accordingly, two 2:1 ((S+1): 1) muxes 450A, 450B are configured to receive the two electrical signals produced by the two (N) active receivers and provide them to two post-amplifiers (not shown). For instance, mux 450A can receive an electrical signal from any one of two (S+1) receivers 460A or 460B as illustrated by lines 462, and output the electrical signal 470A to a post-amplifier. In a similar manner, mux 450B can receive an electrical signal from any one of the two (S+1) receivers 460B or 460C as illustrated by lines 464, and output the electrical signal 470B to a different post-amplifier. By implementing two (N) 2:1 ((S+1):1) muxes after the three (M) receivers 460, two signals may be received on any two of the three available channels, leaving one spare channel for switching.

Figure 5:
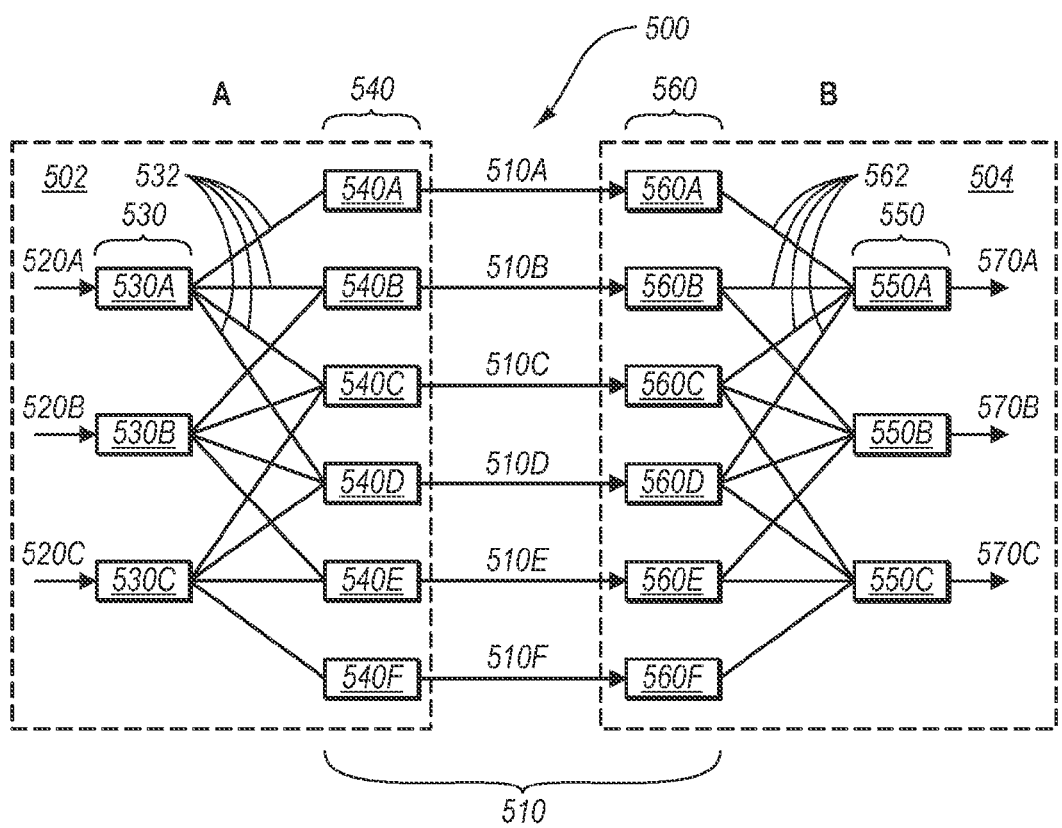
FIG. 5 illustrates a multi-channel communication link having a failure tolerance of three channels.

FIG. 5 illustrates a multi-channel communication link 500 having a failure tolerance of three (S) channels. The basic operation of the multi-channel communication link 500 is similar to that of the multi-channel communication link 400 of FIG. 4. Namely, device A 502 receives N electrical signals, routes them to N of M available transmitters and transforms the N electrical signals to optical signals which are emitted on N active channels. Optoelectronic devices 502, 504 may correspond in one embodiment to optoelectronic devices 110, 120 of FIG. 1, respectively.

Additionally, device A 502 and device B 504 establish a status link whereby device B is aware of which of the M channels are active. Accordingly, device B configures its muxes to receive electrical signals from the appropriate receivers and provides the N electrical signals to post-amplifiers for further processing.

More particularly, device A 502 receives three (N) electrical data signals 520A, 520B and 520C and routes them to any three of six (M) available transmitters 540 using three (N) 4:1 ((S+1):1) demuxes 530. Each demux can be configured to route an electrical signal to any one of four transmitters available to each demux. For instance, demux 530A may route its electrical signal 520A to transmitters 540A-540D, as indicated by the lines 532. Similarly, demux 530B may route its electrical signal 520B to transmitters 540B-540E, while demux 530C may route its electrical signal 520C to transmitters 540C-540F.

Device B 504 receives three (N) optical signals using three active of six (M) receivers 560 and the three active receivers transform the optical signals into electrical signals. The receivers are followed by three (N) 4:1 ((S+1):1) muxes 550. As mentioned earlier, device A and device B establish a status link whereby device B knows which of the M channels 510 are active. In this manner, the muxes 550 are configured to receive electrical signals only from the three (N) active receivers. For instance, if channels 510B, 510E and 510F are active, demux 550A is configured to receive a signal from receiver 560B, demux 550B is configured to receive a signal from receiver 560E and demux 550C is configured to receive a signal from receiver 560F. The electrical signals 570A, 570B and 570C may be provided as output by the muxes 550 to three (N) post-amplifiers.

Each mux 550 may be configured to receive an electrical signal from any one of four receivers. For instance, mux 550A may receive an electrical signal from receivers 560A-560D, as indicated by the lines 562. Similarly, demux 550B may receive an electrical signal from receivers 560B-560E, while demux 550C may receive an electrical signal from receivers 560C-560F.

According to the present embodiment, up to three (S) channels may fail without compromising the link 500. For example, if channels 510D, 510E and 510F failed, device A could configure its demuxes 530A, 530B and 530C to route signals 520A, 520B and 520C through channels 510A, 510B and 510C, respectively. Device B could configure its muxes 550A, 550B and 550C to receive input from channels 510A, 510B and 510C, respectively. The link 500 may similarly be reconfigured for fewer than three (S) channel failures.

Figure 6:
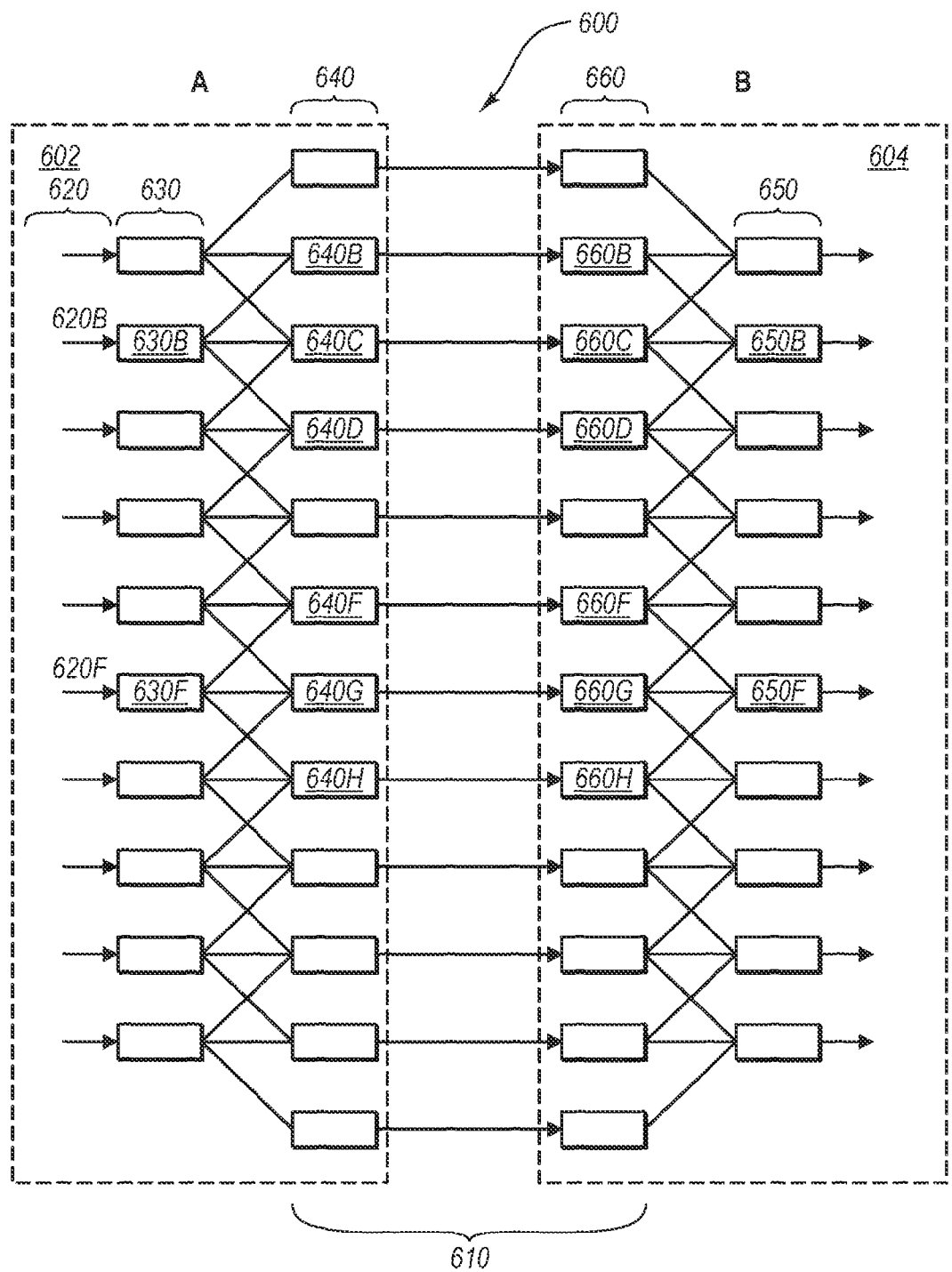
FIG. 6 illustrates a multi-channel communication link having a failure tolerance of two channels.

FIG. 6 illustrates a multi-channel communication link 600 having a failure tolerance of two (S) channels. The basic operation of the multi-channel communication link 600 is similar to that of link 500 of FIG. 5 and link 400 of FIG. 4. For this reason, the details of its operation will not be discussed in depth. According to one embodiment, the link 600 is capable of establishing ten (N) by 10 Gigabits/s (G) channels in both the A-to-B and B-to-A directions to achieve 100 G duplex communication, with two spare channels in each direction for redundancy. However, FIG. 6 illustrates only the A-to-B direction.

The link 600 has ten (N) active channels, each of which carries one of ten incoming electrical data signals 620 received by device A 602 from a host. The ten (N) active channels may be any ten channels selected from twelve (M) available channels 610. The link 600 has two (S) spare channels. As such, two physical channels may fail without compromising the link 600. Device A has ten (N) 3:1 ((S+1):1) demuxes 630 and twelve (M) transmitters 640. The ten demuxes 630 route the ten electrical signals 620 to ten of the twelve transmitters. Each demux may route its electrical signal to one of three transmitters available to it. By way of example, demux 630B may route signal 620B to any one of transmitters 640B-640D. Similarly, demux 630F may route signal 620F to any one of transmitters 640F-640H.

Optoelectronic device B has twelve (M) receivers 660 and ten (N) 3:1 ((S+1):1) muxes 650. Ten (N) of the twelve (M) receivers are active, receiving optical signals that are converted to electrical signals. The ten muxes 650 are configured to receive ten electrical signals from the ten active receivers and provide them to ten post-amplifiers (not shown). Each mux may receive an electrical signal from one of three receivers available to it. By way of example, mux 650B may be configured to receive an electrical signal from any one of receivers 660B-660D. Similarly, mux 650F may be configured to receive an electrical signal from any one of receivers 660F-660H.

In some embodiments of the invention, each of device A 402, 502, or 602, device B 404, 504, or 604 and physical channels 410, 510, or 610 in FIGS. 4-6 can be implemented within an integrated cable to provide an active cable with one or more redundant channels. Embodiments of an active cable with one or more redundant channels are disclosed in greater detail in U.S. patent application Ser. No.: 11/952,832 entitled PARALLEL HIGH-SPEED COMMUNICATION LINKS WITH REDUNDANT CHANNEL ARCHITECTURES, filed Dec. 7, 2007, which application is herein incorporated by reference in its entirety.

Those of skill in the art will recognize, with the benefit of the present disclosure, that the redundant channel architectures illustrated in FIGS. 4-6 are illustrative only and that any number of N active channels, M available channels and S spare channels may be implemented to fulfill a particular need and/or design.

According to another embodiment of the invention, a single optoelectronic device having spare channels can be implemented in conjunction with a conventional optoelectronic device having no spare channels, as described below with respect to FIGS. 11 and 12. For instance, optoelectronic device A 602 of FIG. 6 could be coupled via an MPO 12 fiber patch cord 610 to a conventional optoelectronic device having only 10 receives channels in the A-to-B direction. In this case, device A 602 may be configured to interoperate with the conventional device by, among other things, routing ten electrical signals to ten default transmitters to communication over ten default channels.

According to embodiments of the present invention, two status-link enabled devices (e.g., one at A and one at B) can establish a status link over two or more main communication channels in both the A-to-B ad B-to-A directions, either by itself or in combination with two or more main communication links, to provide a robust and redundant status link and permit the switching out of failed or impaired channels. For a given direction A-to-B or B-to-A, primary data signals of the main communication links are generated when a high frequency primary data modulation signal, $I_{mod}$, generated by each of the N drivers 204 from the N input electrical signals 202, modulates a laser bias current, $I_{bias}$ output by one of M DACs 306. The modulated bias current drives a transmitter to produce an optical signal representative of the primary data from the input electrical signal.

In order to establish a status link on a channel, $I_{bias}$ for the channel (more particularly, $I_{bias}$ for the transmitter of the channel) is effectively modulated with a low frequency status link modulation signal, $I_{mod\_status}$, representative of status data prior to being provided to a transmitter. A status link may be established by itself without a main communication link by providing the status link modulated $I_{bias}$ to a transmitter which emits an optical signal representative of the status data. A status link may be established in combination with a main communication link by further modulating the status link modulated $I_{bias}$ with $I_{mod}$ and providing the resulting signal to a transmitter, which emits an optical signal representative of both the status data and the primary data of the main communication link. While establishing the status link on all of the N active communication channels in a given direction provides the greatest failure tolerance, establishing the status link on as few as two of the N active communication channels still provides some failure tolerance. Hence, the principles of the present invention apply so long as the status link is established on two or more of the N active communication channels in a given direction. In the event that the status link is established on fewer than all of the N active channels, devices A and B may be configured to establish the status link over predetermined channels. In this manner, the device receiving the status data can detect the status data on the appropriate channels.

Figures 7, 8:
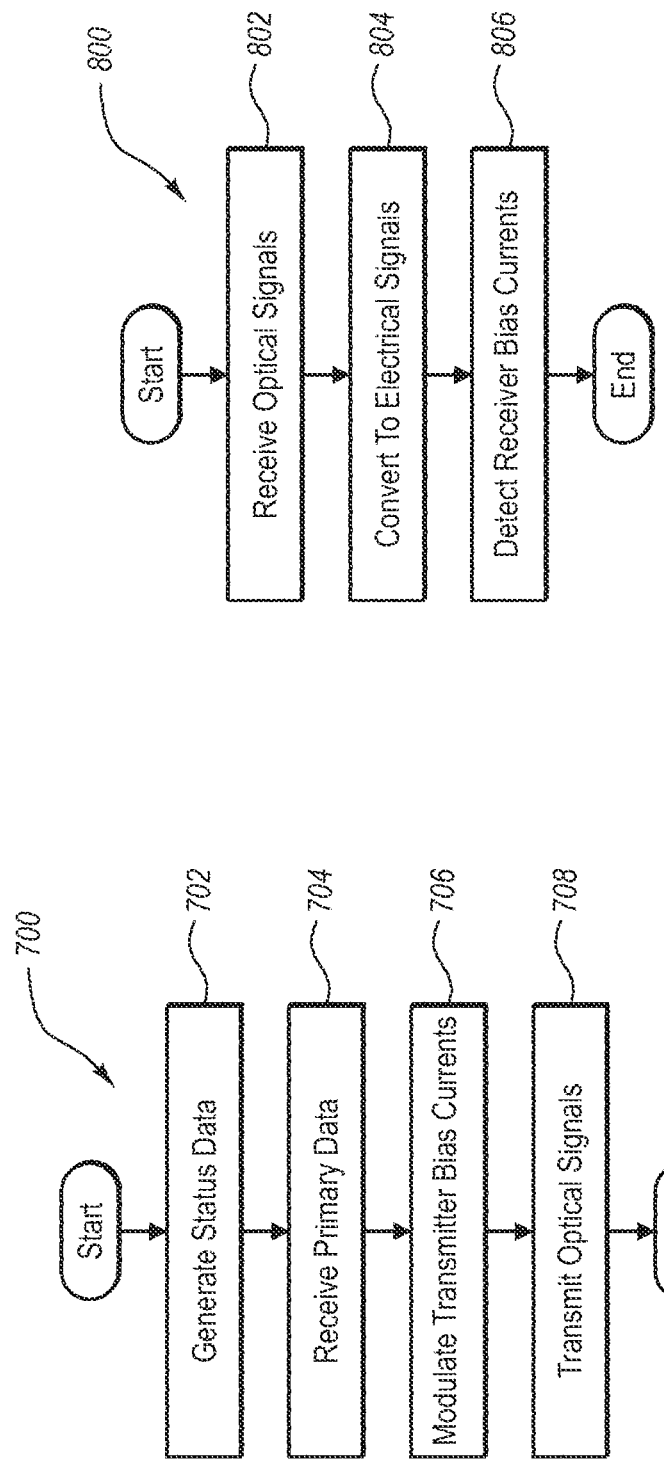
FIG. 7 depicts a method for effectively modulating transmitter bias currents with a status link modulation signal.
FIG. 8 illustrates a method for detecting a status link modulation signal by monitoring receiver bias currents.

Referring now to FIGS. 1, 3 and 7, a method 700 is described for establishing a status link in the A-to-B direction of multi-channel communication link 150 of FIG. 1. One of skill in the art will appreciate, with the benefit of the present disclosure, that a status link in the B-to-A direction may similarly be established. The process 700 begins when a controller A 111 generates 702 status data. Many times, the status data may be indicative of one or more conditions affecting the performance of multi-channel optical communication link 150; thus, controller A 111 may generate status data by monitoring various operational and/or environmental parameters of the optoelectronic device A 110.

For instance, controller A 111 of device A may determine that one of N active channels is impaired or nonfunctional and may wish to switch it out for one of S spare channels. This may be due to a failed or impaired transmitter or receiver. Alternately, the status data may be an instruction set stored in memory, invoked when a main communication link is first established. For instance, when a main communication link is first established by optoelectronic device A, an instruction set may cause optoelectronic device A to cycle through its M available receivers to determine which S receivers have the lowest receiver bias current, or through its M available transmitters to determine which S transmitters have the highest transmitter bias currents. In both cases when received by optoelectronic device B, the generated status data may cause optoelectronic device B to switch out or cycle through corresponding transmitters and receivers at the same time as optoelectronic device A. While specific types of status data have just been disclosed, those of skill in the art will recognize that other status data may alternately or additionally be generated as desired.

If the status link is combined with two or more main communication links, each of the N drivers of device A 110 receives 704 a primary data signal used to establish a main communication link over one of the M available physical channels. The primary data signals may be transformed into optical signals according to methods known in the art, an example of which is described in the remainder of this paragraph. In a typical embodiment, the primary data signals may be line coded using 8B/10B, 64B/66B or some other encoding scheme designed to inhibit undesirably long strings of logic value zeros or logic value ones which may otherwise disrupt system operation. The line coding may occur in the drivers, where further conditioning of the primary data signals (e.g., waveform shaping or the like) may optionally occur, ultimately resulting in N primary data modulation signals. N digital to analog converters (DACs) in controller A 111 each provides a transmitter bias current to be modulated by one of the N primary data modulation signals. Each of the N DACs uses a digital transmitter bias current value supplied by a processor of controller A 111 and a common reference voltage to convert the digital transmitter bias current value into a transmitter bias current. The resulting N transmitter bias currents provide sufficient current to each of N active transmitters for the lazing function of the N active transmitters. Each of the N transmitter bias currents are modulated by a different primary data modulation signal and the primary-data modulated signals are used to drive the N active transmitters, producing N optical signals.

If the status link is established by itself not in combination with two or more main communication links, the N drivers may not receive 704 primary data signals in which case N main communication links are not established. Instead, only a redundant status link is established. Two or more of the N DACs still combine digital transmitter bias current values from a processor of controller A 111 with a signal from a common reference voltage in order to provide transmitter bias currents to two or more transmitters. In this case, the transmitter bias currents are not modulated by the primary data modulation signals prior to being provided to the two or more transmitters.

To enable the advantages of the present invention, two or more of the N transmitter bias currents are effectively modulated 706 with a low frequency status link modulation signal prior to being modulated by primary data modulation signals. According to one embodiment, this is done by modulating the signal from a common reference voltage 310, as illustrated in FIG. 3. The status data generated by the processor of controller A 111 is provided to a modulator 312, which generates the status link modulation signal. The modulator 312 receives the signal supplied by the common reference voltage 310 and modulates it with the status link modulation signal. The status-link modulated common reference voltage signal is provided to the N DACs 306, which use the digital transmitter bias current values received from the processor and the status-link modulated common reference voltage signal to create status-link modulated transmitter bias currents.

In order to avoid interfering with the main communication links, the modulator 312 modulates the signal from the common reference voltage 310 with a low frequency to ensure that the status link modulation bandwidth is below a high pass cut-off frequency of the main links. Although not illustrated, the N transmitter bias currents (whether status-link modulated or not) may be low pass filtered to provide stable currents for the main communication links, which is consistent with keeping the status link modulation bandwidth below the high pass cut-off frequency of the main links. Those of skill in the art will recognize, with the benefit of the present disclosure, that the common reference voltage signal may be modulated for at least two of the N DACs to provide some status link failure tolerance, while modulating the reference voltage signal for three or more of the N DACs provides increasingly higher status link failure tolerance.

In another embodiment of the invention, rather than modulating the common reference voltage signal for the N transmitter bias currents with the status link modulation signal, the processor of controller A 111 modulates the digital transmitter bias current values for two or more of the N active transmitters with the status link modulation signal. In this embodiment, the processor of controller A 111 uses previously generated status data to generate a status link modulation signal. Within the controller 300, the status link modulation signal is combined with two or more of the N digital transmitter bias current values to produce status-link modulated digital transmitter bias current values. Accordingly, the status-link modulated digital transmitter bias current values are provided to the DACs 306 and the DACs produce status-link modulated transmitter bias currents for modulation by the primary data modulation signals. If the status link modulation signal is combined with less than all N of the digital transmitter bias current values, the remaining digital transmitter bias current values are utilized as-is to produce regular transmitter bias currents. As with the previous embodiment, failure tolerance increases as the number of status-link modulated transmitter bias currents increases.

After two or more of the N transmitter bias currents have effectively been status-link modulated, each of the status-link modulated transmitter bias currents (and regular transmitter bias currents, if any) is provided to a different transmitter 112. When the status link is combined with two or more main communication links, each of the transmitter bias currents (status-link modulated and regular) is additionally modulated by a different primary data modulation signal prior to being provided to the transmitters 112. Due to the effective modulation of two or more of the transmitter bias currents with the stats link modulation signal, two or more of the N active transmitters 112 emit 708 optical data signals representative of the status data. The emitted optical signals may also be representative of primary data if the status link is combined with two or more main communication links.

According to the method 700 of FIG. 7, the status link may be established over two or more communication channels. Advantageously, the status link may be established by itself or with two or more main communication links in a manner that does not corrupt the main communication links. Further, the established status link is redundant and robust when established over multiple channels. When every one of the N transmitter bias currents are effectively modulated with the status data, the status link is the most redundant and robust. Indeed, in this case N−1 channels out of the N active channels can fail before the status link fails. This means that under most failure scenarios (e.g., at most N−1 of the N main communication links have failed), the status link can be used to reconfigure the main communication links.

With reference now to FIGS. 1, 3 and 8, an example method 800 is described for detecting a status link at device B 120 in the A-to-B direction of multi-channel communication link 150 of FIG. 1. Those skilled in the art will appreciate, with the benefit of the present disclosure, that a stats link in the B-to-A direction may similarly be detected. The process 800 begins after optoelectronic device A 110 effectively applies a status link modulation signal to two or more transmitter bias currents to encode status data with primary data and optically transmits the status data and primary data to optoelectronic device B 120. The status data may be recovered by monitoring aspects of the received signals since the status data controls the low frequency intensity modulation of the received optical data signals.

In a typical embodiment, the device B 120 receives 802 a total of N optical signals, the N optical signals being received on N out of M available channels. However, if one or more of the main communication channels is not functioning or not in use for any reason, optoelectronic device B 120 may receive 502 less than a total of N optical signals. In this case, the status link can be used in reestablishing the nonfunctional or unused main communication channel(s).

According to embodiments of the invention, two or more of the N optical signals include status data. The N optical signals may additionally include primary data. Either way, the N optical signals are received by N active receivers (out of M available receivers 122), each of which converts 804 a different optical signal to an electrical signal. It is contemplated that when the status link is combined with two or more main communication links, the status link modulation signal is such that it does not interfere with subsequent processing of any of the N main communication links with which the status link may have been combined. Accordingly, the N electrical signals, whether some or all of the signals comprise both primary data and status data, may be provided to N post amplifiers of device B 120 for further processing without demodulating the status data from the electrical signals.

The M receivers 122 may comprise photodetectors such as PINs, APDs, or the like. Each of the N active receivers has a power supply that can source diode bias current, also referred to as "receiver bias current." In one embodiment, a common power supply is shared by all N active receivers. The reception by the N active receivers of optical signals including status data changes the receiver bias currents produced by each. Receivers which receive optical signals including status data (optionally combined with primary data) will be referred to as status link receivers. The receiver bias currents provided by status link receivers will be referred to as status-link modulated receiver bias currents. Accordingly, the status link modulation is monitored by detecting 806 the status-link modulated receiver bias currents of the status link receivers. Receiver bias currents for any remaining receivers may also be detected, but the status-link modulated receiver bias currents are the ones primarily used in monitoring the status link modulation.

In one embodiment of the invention, the status-link modulated receiver bias currents are detected by returning them to a common point, such as a common power supply. If all N active channels include status data, then N status-link modulated receiver bias currents are returned to the common power supply. If only two or more (but less than N) active channels include status data, then only two or more status-link modulated receiver bias currents are returned to the common power supply. In either case, the total supply current of the power supply may be detected using sensors, including those known in the art and those yet to be developed. In an optoelectronic device including a controller 300 described above, the total supply current may be detected using one or more of the external lines 316A and 316B. By detecting the total supply current of the power supply to which the status-link modulated receiver bias currents are returned, the status data may be extracted from the status-link modulated receiver bias currents.

In another embodiment of the invention, status data is extracted from status-link modulated receiver bias currents by detecting status-link modulated receiver bias current values in digital form in controller B 121. Although not required in all embodiments of the invention, the present embodiment of the invention implements digital monitor and control methods with controller B, which may correspond to the controller 300 of FIG. 3 in one embodiment. In this embodiment, status-link modulated receiver bias currents can be converted by analog to digital converters (ADCs) 308 into digital status-link modulated receiver bias current values. Alternately, one ADC 308 could be used with an analog multiplexer to create one digital multiplexed status-link modulated receiver bias current value. In either case, the status-link modulated receiver bias currents can be monitored by a processor of controller B 121, which obtains digital status-link modulated receiver bias current values from the ADCs 308. The status data may be extracted by the processor from the digital status-link modulated receiver bias current values.

Various modulation techniques may be used to effectively apply the status link modulation signal to two or more transmitter bias currents. In one embodiment, low frequency amplitude modulation may be applied, as disclosed in United States patent application entitled STATUS LINK FOR MULTI-CHANNEL OPTICAL COMMUNICATION SYSTEMS, filed Feb. 28, 2008. Other modulation techniques may also be applied as are known or are later developed in the art.

Figure 9:
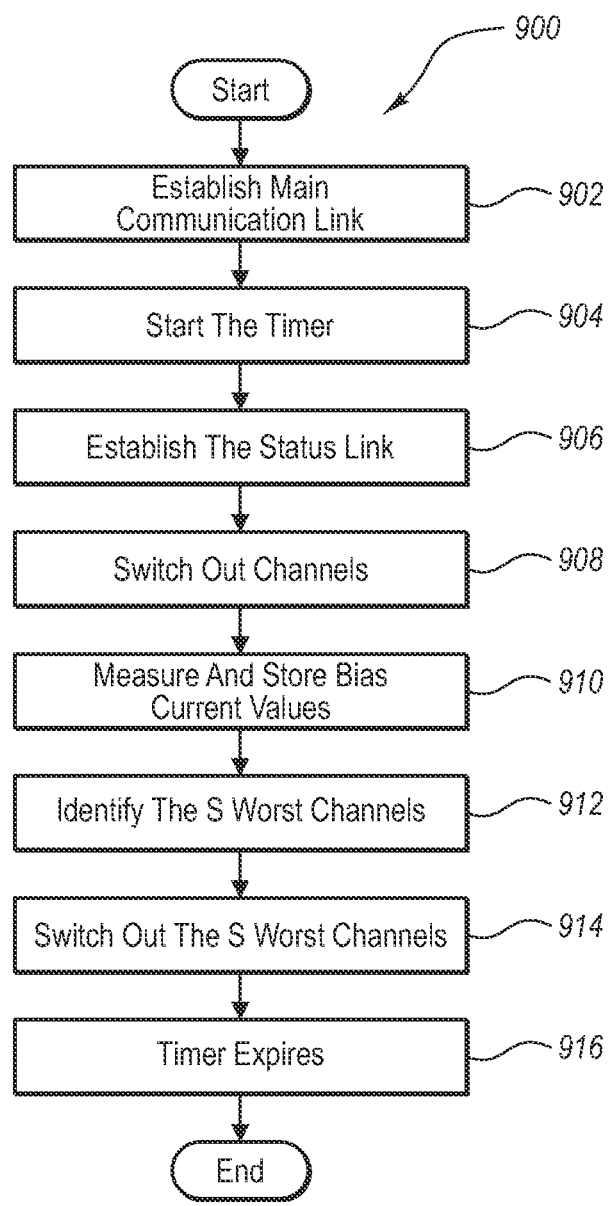
FIG. 9 depicts a method for providing automatic redundancy in a multi-channel communication link having one or more spare channels.

With additional reference to FIG. 9, a method 900 for providing automatic selection of N good channels out of M available channels in an optical communication system is explained. The method 900 may be performed in whole or in part in optoelectronic device A 110, 402, 502, 602 and/or optoelectronic device B 120, 404, 504, 604 of FIGS. 1, and/or 4-6. The method begins by establishing 902 a main communication link between optoelectronic device A and optoelectronic device B. In one embodiment, establishing the main communication link may occur in response to any one of three events detectable by a controller A or controller B of optoelectronic device A or B, respectively. First, the link hardware and the controller A or B may be powered up. Second, the link hardware and the controller A or B may be reset by the communication system (e.g., by the line card). Third, the link hardware may be plugged in, permitting light transmitted from the other side of the link to be detected.

Once the controller A or B is running, it can enter into a link establishment mode, comprising steps 904-916 that follow. A timer can be started 904 to limit the amount of time that the controller A or B can spend in the link establishment mode. Controller A (and/or controller B) next establishes 906 a status link with controller B (and/or controller A). The establishment 902 of the main communication link and/or the occurrence of any of the three events described above may invoke an instruction set stored in volatile and/or nonvolatile memory, thereby generating status data to be transmitted over the status link.

Based on the instruction set, controller A and controller B may proceed to cycle through or switch out 908 the M physical channels in the A-to-B direction and the M physical channels in the B-to-A direction. In a typical embodiment, controller A switches out the first S receivers of optoelectronic device A and signals, over the A-to-B status link, controller B to switch out S corresponding transmitters of optoelectronic device B. Similarly, controller B switches out the first S receivers of optoelectronic device B and signals, over the B-to-A status link, controller A to switch out S corresponding transmitters of optoelectronic device A. One embodiment of the process of switching out or cycling through channels is illustrated in more detail with respect to FIGS. 10A-10H below. Alternately, controller A can switch out the first S transmitters of optoelectronic device A and signal controller B to switch out S corresponding receivers of optoelectronic device B, while controller B similarly switches out device B's first S transmitters and signals controller A to switch out device A's S corresponding receivers.

Once the first set of receivers and/or transmitters are switched out in optoelectronic device A, controller A measures and stores 910 digital receiver and/or transmitter bias current values for its active channels. Similarly, once the first set of receivers and/or transmitters are switched out in optoelectronic device B, controller B measures and stores 910 digital receiver and/or transmitter bias current values for its active channels.

Continuing with the method 900 of FIG. 9, steps 808 and 810 can be repeated until digital receiver and/or transmitter bias current values are measured and stored for each of the M receivers and transmitters of optoelectronic devices A and B. In particular, controller A proceeds to switch out 908 the next set of S receivers at optoelectronic device A and signals controller B to switch out S corresponding transmitters of optoelectronic device B. Controller B proceeds to switch out 908 the next set of S receivers at optoelectronic device B and signals controller A to switch out S corresponding transmitters of optoelectronic device A. The amount of status data signaled from controller A to controller B may be minimized by switching out the transmitters corresponding to the last S switch out requests. In this case, with the exception of the first (S−1) switch out requests, controller A only needs to send one channel number to controller B to result in the desired S channels being switched out as long as controller B switches out the channels from the last S switch out requests every time controller B receives a new switch out request. The status data signaled from controller B to controller A may similarly be minimized.

As channels are switched out, each controller measures and stores 910 digital transmitter and receiver bias current values. In one embodiment, this process of switching out, measuring and storing is repeated M times to measure all M channels. In another embodiment, the transmitter and receiver bias current values for N active channels may be measured simultaneously so that only one (or fewer than M) switch out is necessary in order to measure S spare channels not operated during the first measurement.

Based on the stored digital bias current values in both the A-to-B and B-to-A directions, each controller may identify 912 the S worst channels for switching out, for example the S channels with the lowest receive power as determined from the receiver bias currents, or the S channels with the highest transmitter bias currents. Alternately or additionally, other criteria may be used to identify the S worst channels. For example, the transmitters and/or receivers of one or more of the optoelectronic devices can be measured in the factory, one or more of which can be identified as permanently defective in the controller.

Finally, the controllers A and B switch out 914 the worst S channels in both directions (A-to-B and B-to-A). This may be done according to various protocols. For instance, controller A may switch out the S worst receivers at optoelectronic device A and signal controller B to switch out S corresponding transmitters at optoelectronic device B. Controller B also switches out the S worst receivers at optoelectronic device B and signals controller A to switch out S corresponding transmitters at optoelectronic device A. According to a different protocol, controller A switches out the worst S transmitters at optoelectronic device A and signals optoelectronic device B to switch out S corresponding receivers at optoelectronic device B. Similarly, controller B switches out the worst S transmitters at optoelectronic device B and signals controller A to switch out S corresponding receivers at optoelectronic device A. Other protocols may also be applied to switch out the worst S channels in each direction. In a typical embodiment, the link establishment mode continues until the timer expires 916, after which no more physical channel switching can be done until a main communication link is once again established.

One skilled in the art will appreciate that the method 900 is illustrative only, and can be modified. For instance, the main communication channels in each direction can be continuously monitored during normal operation and automatically switched out when a channel fails and/or when a channel's performance falls below some predetermined threshold.

FIGS. 10A-10H illustrate in more detail the iterative cycling or switching out process described above with regard to step 908 of FIG. 9, confined to the A-to-B direction of a multi-channel communication link 1000. Those of skill in the art will recognize that similar iterations may be simultaneously made in the B-to-A direction. Concerning FIGS. 10A-10H, identical reference numbers indicate identical elements. According to one embodiment, the link 1000 is capable of transmitting four (N) by 10 G channels in the A-to-B and B-to-A (not shown) directions in order to achieve 40 G communication speeds in both directions.

The link 1000 has four (N) active channels, each of which carries data from one of four incoming electrical data signals 1020 received by optoelectronic device A 1002 durign operation. The four (N) active channels may be any four channels selected from six (M) available channels 1010. The link 1000 has two (S) spare channels. Optoelectronic device A 1002 includes four (N) 3:1 ((S+1):1) demuxes 1030 and six (M) transmitters 1040. The four demuxes 1030 route the four electrical signals 1020 to four of the six transmitters. Each demux may route its electrical signal to one of three transmitters available to it. Although not illustrated, optoelectronic device A 1002 may include four drivers (positioned before the demuxes 1030) or six drivers (positioned after the demuxes 1030).

Optoelectronic device B 1004 has six (M) receivers 1060 and four (N) 3:1 ((S+1): 1) muxes 1050. During operation, four (N) of the six (M) receivers are active, receiving optical signals that are converted to electrical signals. The four muxes 1050 are configured to receive four electrical signals from the four active receivers and provide them to four post-amplifiers (not shown). Each mux may receive an electrical signal from one of three receivers available to it. Although not illustrated, optoelectronic device B 1004 may include six post-amplifiers (positioned before the muxes 1050) or four post-amplifiers (positioned after the muxes 1050).

Figure 10A:
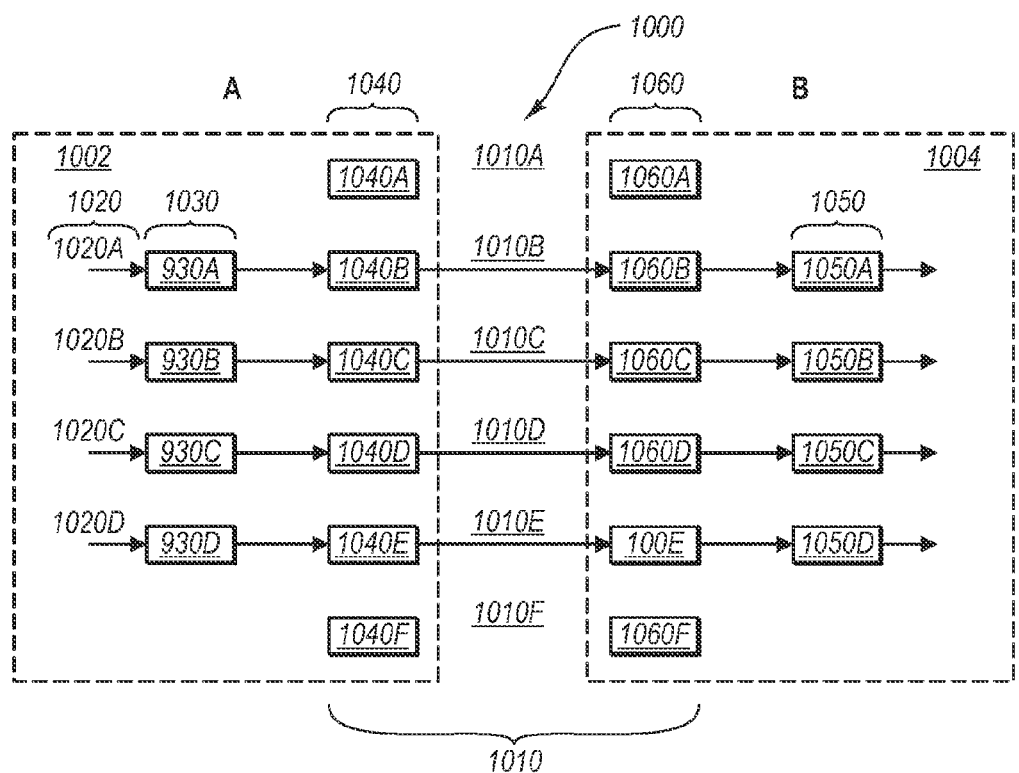
FIGS. 10A-10H illustrate an iterative switching out process occurring in a multi-channel communication link having a failure tolerance of two channels.

FIG. 10A illustrates one default configuration for optoelectronic device A and optoelectronic device B. When optoelectronic device A first attempts to establish one or more main communication links with optoelectronic device B, the default settings from controller A may instruct the demux 1030A to route a received electrical signal 1020A through transmitter 1040B. Similarly, demuxes 1030B, 1030C and 1030D are instructed to route received electrical signals 1020B, 1020C and 1020D through transmitters 1040C, 1040D and 1040E, respectively. In this manner, channels 1010B, 1010C, 1010D and 1010E are active. Optoelectronic device B has default settings complementary to those of optoelectronic device A such that mux 1050A is configured to receive an input from receiver 1060B, and muxes 1050B, 1050C and 1050D are respectively configured to receive inputs from receivers 1060C, 1060D and 1060E. The default configuration of FIG. 10A is described by way of example only and may be changed by mutual agreement of controllers A and B at any time.

After main communication links are established over each of the physical channels 1010B-1010E and/or in response to any one of the three detectable events described above, the controllers A and B establish a status link. In particular, controller A may establish a status link over two or more of channels 1010B-1010E and controller B may establish a status link over two or more of four active channels in the B-to-A direction (not shown).

Figure 10B:
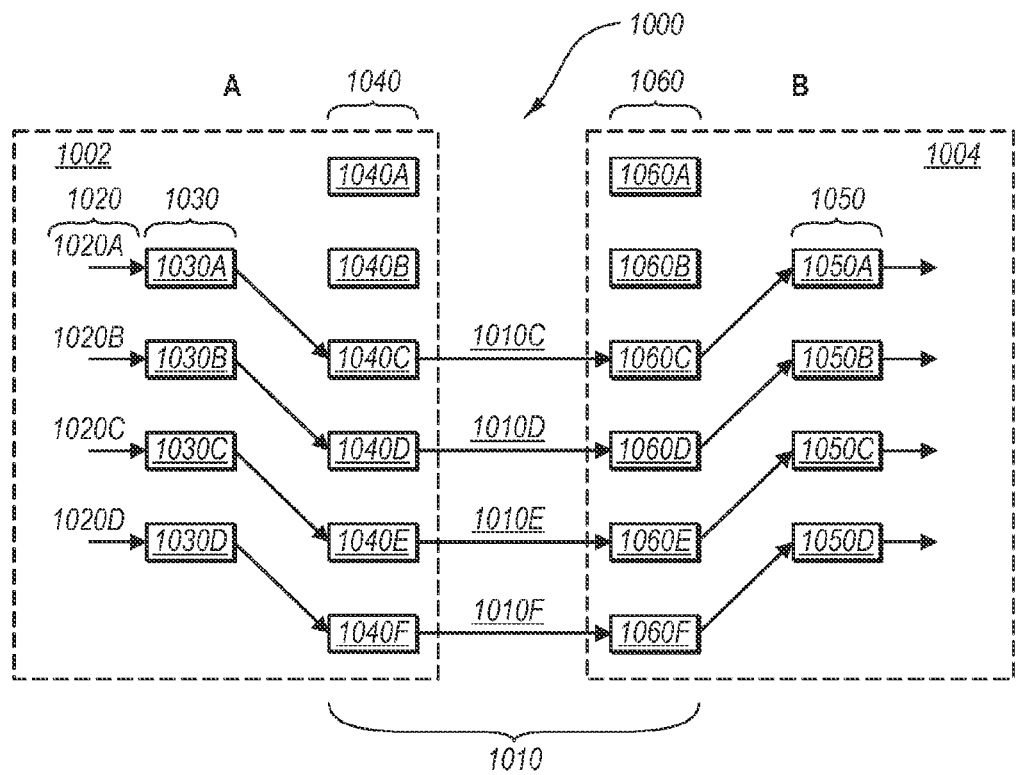
Figure 10C:
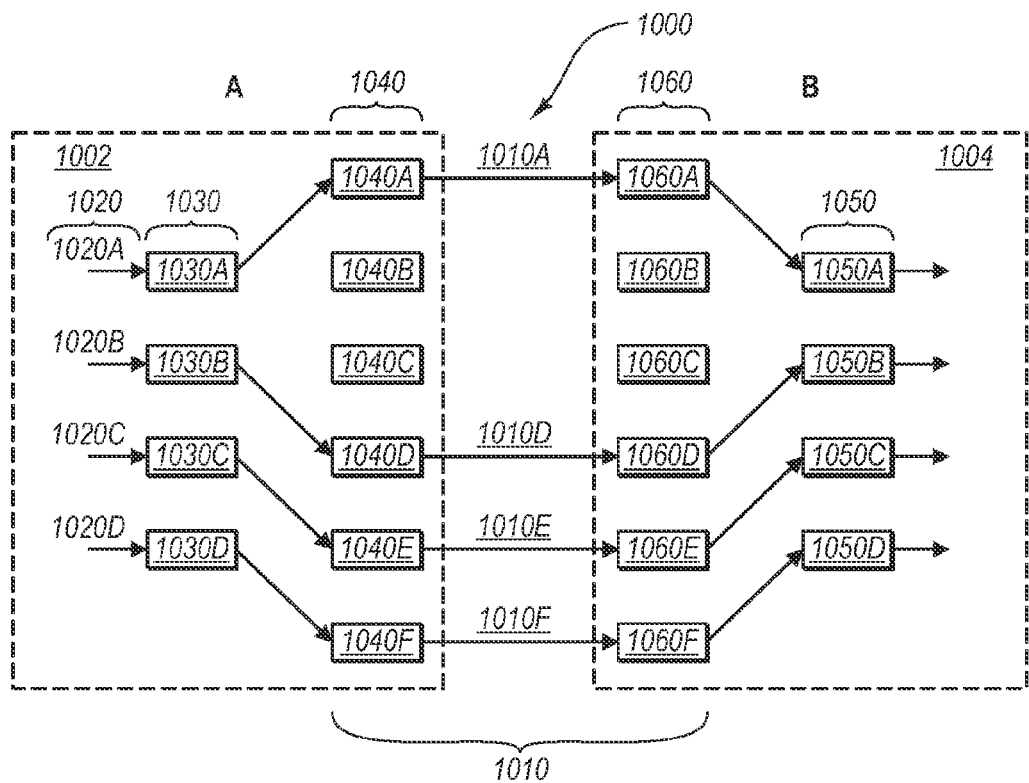

FIG. 10B illustrates a first iteration that may occur once controller B has established a status link in the B-to-A direction. Namely, controller B switches out the first two channels 100A and 1010B by instructing the multiplexers 1050A, 1050B, 1050C and 1050D to receive inputs from receivers 1060C, 1060D, 1060E and 1060F, respectively. Additionally, controller B also uses the status link in the B-to-A direction to signal controller A to switch out transmitters 1040A and 1040B, accomplished by controller A instructing the demuxes 1030A, 1030B, 1030C and 1030D to route incoming electrical signals 1020A, 1020B, 1020C and 1020D to transmitters 1040C, 1040D, 1040E and 1040F respectively. Alternately or additionally, in any one or more of FIGS. 10A-10H, controller A may switch out two of the channels 1010 by switching out two of transmitters 1040 and using the A-to-B status link to instruct controller B to switch out two corresponding receivers 1060. In either case, after the switch out occurs, controller A may monitor and store the digital transmitter bias current values of transmitters 1040C-1040F and controller B may monitor and store the digital receiver bias current values of receivers 1060C-1060F In a second iteration depicted in FIG. 10C, controller B switches out the second and third channels 1010B and 1010C by instructing the mux 1050A to receive its input from receiver 1060A while instructing the muxes 1050B, 1050C and 1050D to maintain their configurations. Alternately, controller B may reconfigure mux 1050A as described and simply leave muxes 1050B, 1050C and 1050D alone. Controller B uses the status link in the B-to-A direction to signal controller A to switch out transmitters 1040B and 1040C. To minimize the data transmitted over the status link, controller B may only signal controller A to switch out transmitter 1040C if controller A is configured to switch out the receivers corresponding to the last S switch out requests it receives. In other words, controller A only has to be instructed to switch out transmitter 1040C if it remembers that it was instructed to switch out transmitter 1040B in the previous iteration. Controller A instructs the demux 1030A to route an incoming electrical signal 1020A to transmitter 1040A, while instructing the demuxes 1030B, 1030C and 1030D to maintain their configurations. Alternately, controller A may reconfigure demux 1030A as described and simply leave demuxes 1030B, 1030C and 1030D alone. Once again, controller A monitors and stores the digital transmitter bias current values of its active transmitters and controller B monitors and stores the digital receiver bias current values of its active receivers.

Figure 10D:
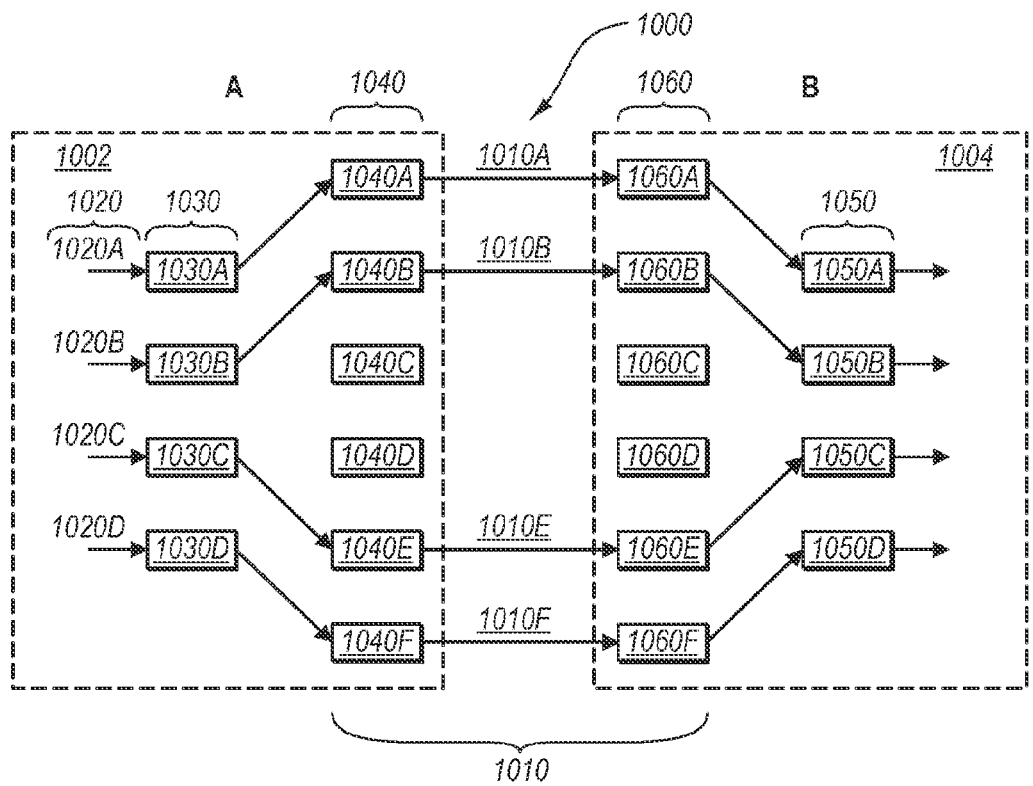

A third iteration is illustrated in FIG. 10D, where controller B switches out the third and fourth channels 1010C and 1010D by reconfiguring the mux 1050B to receive its input from receiver 1060B, while leaving the muxes 1050A, 1050C and 1050D alone. Controller B uses the status link in the B-to-A direction to signal controller A to switch out transmitters 1040C and 1040D. Controller A reconfigures the demux 1030B to route an incoming electrical signal 1020B to transmitter 1040B, while leaving the demuxes 1030A, 1030C and 1030D alone. Controllers A and B respectively monitor and store transmitter bias currents and receiver bias currents for their active components.

Figure 10E:
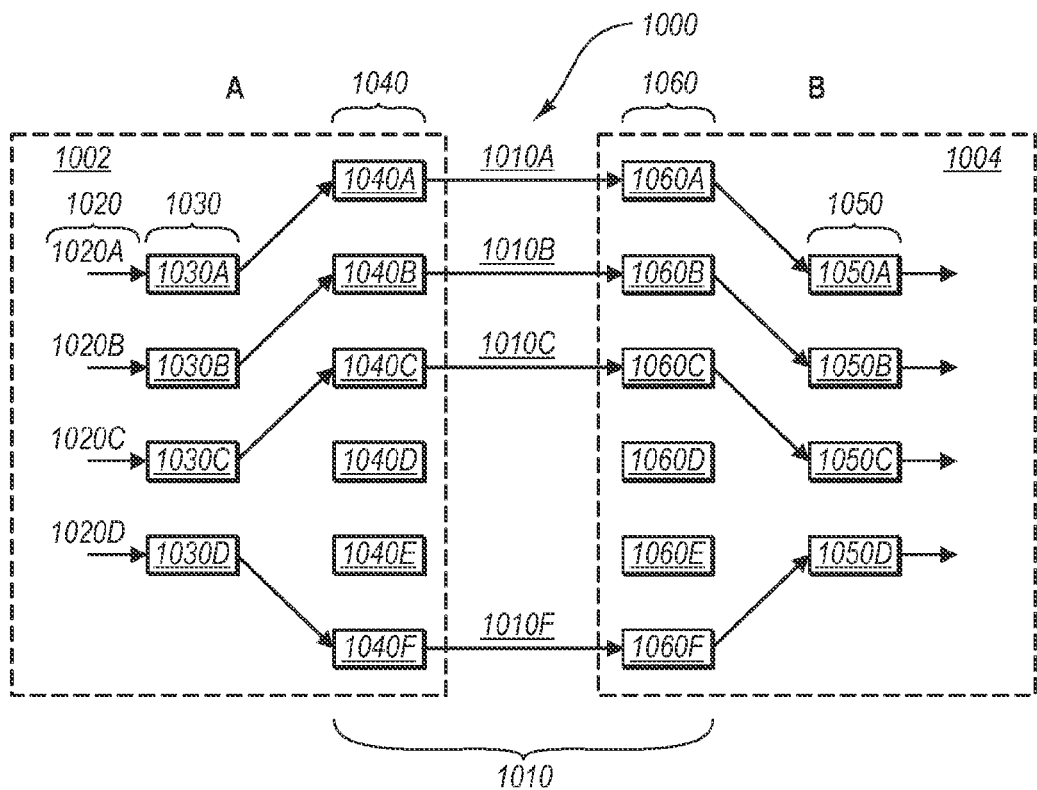

FIG. 10E illustrates a fourth iteration, wherein controller B switches out the fourth and fifth channels 1010D and 1010E by reconfiguring the mux 1050C to receive its input from receiver 1060C, while leaving the muxes 1050A, 1050B and 1050D alone. Controller B uses the status link in the B-to-A direction to signal controller A to switch out transmitters 1040D and 1040E. Controller A reconfigures the demux 1030C to route an incoming electrical signal 1020C to transmitter 1040C, while leaving the demuxes 1030A, 1030B and 1030D alone. Controllers A and B respectively monitor and store transmitter bias currents and receiver bias currents.

Figure 10F:
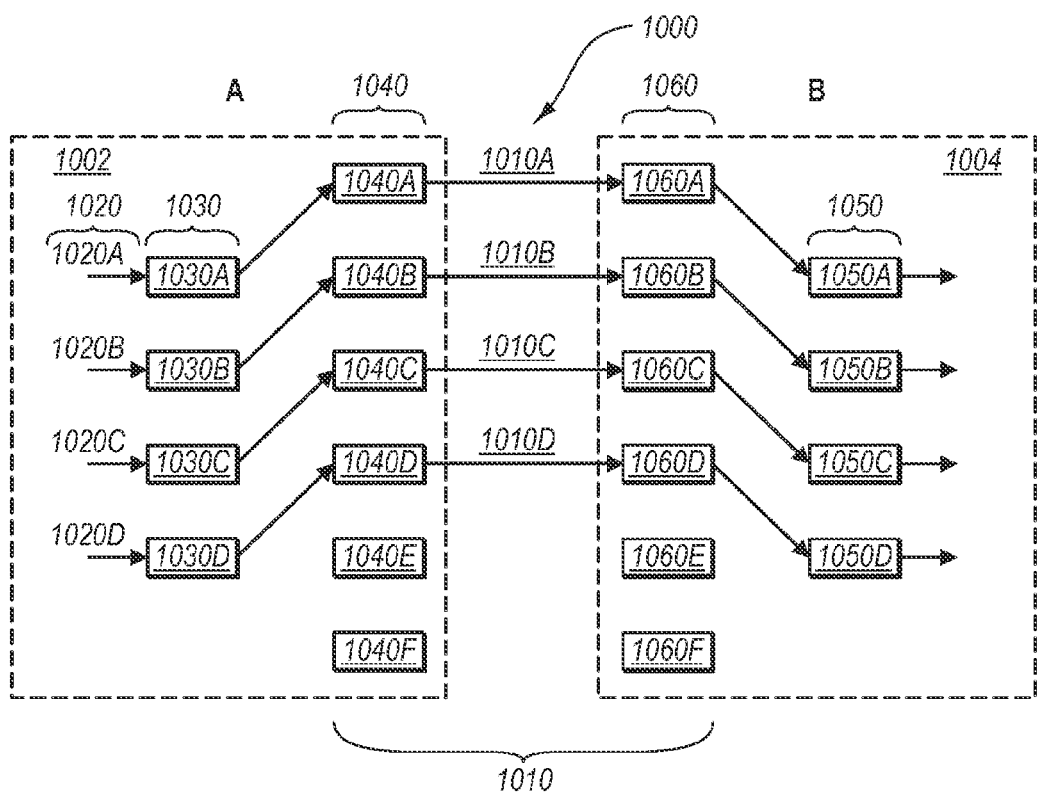

In a fifth iteration depicted in FIG. 10F, controller B switches out the fifth and sixth channels 1010E and 1010F by reconfiguring the mux 1050D to receive its input from receiver 1060D, while leaving the muxes 1050A, 1050B and 1050C alone. Controller B uses the status link in the B-to-A direction to signal controller A to switch out transmitters 1040E and 1040F. Controller A reconfigures the demux 1030D to route an incoming electrical signal 1020D to transmitter 1040D, while leaving the demuxes 1030A, 1030B and 1030C alone. Controllers A and B respectively monitor and store transmitter bias currents and receiver bias currents.

Figure 10G:
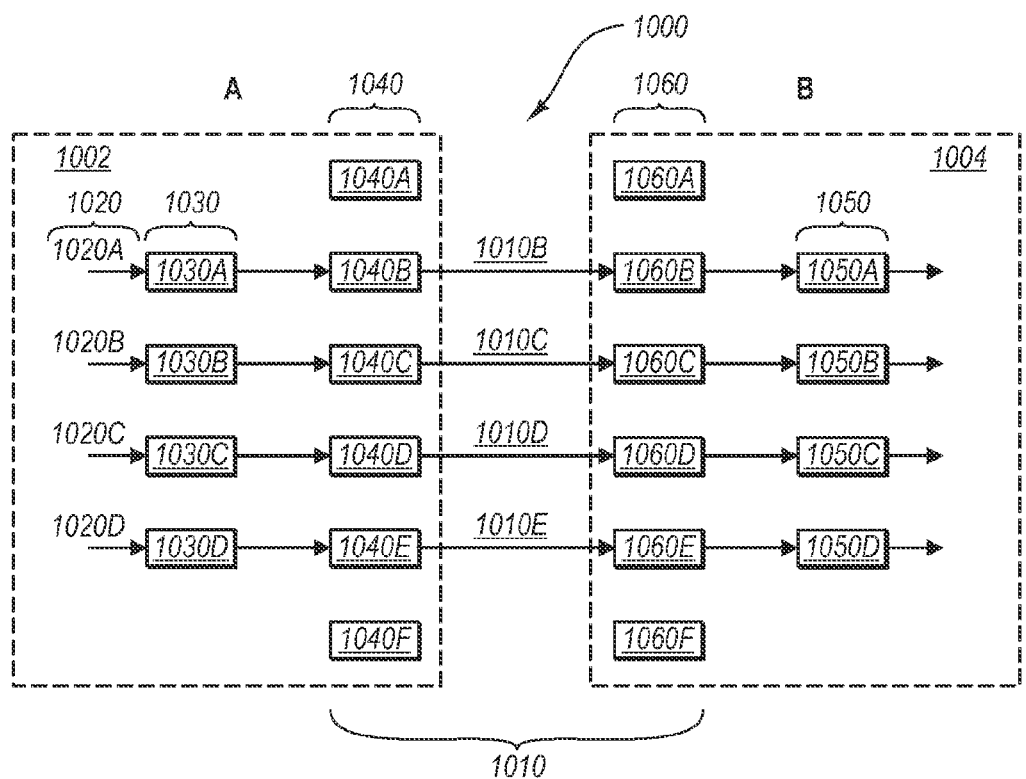

A sixth and final iteration is illustrated in FIG. 10G, where controller B switches out the sixth and first channels 1010F and 1010A by reconfiguring every mux 1050A, 1050B, 1050C and 1050D as shown. Controller B uses the status link in the B-to-A direction to signal controller A to switch out transmitters 1040F and 1040A. Controller A reconfigures every demux 1030A, 1030B, 1030C and 1030D as shown. Controllers A and B respectively monitor and store transmitters bias currents and receiver bias currents.

By performing at least one iteration, the controller A or B may identify the two (S) worst channels in the A-to-B direction and switch them out. For instance, controller B can identify the two channels with the lowest optical receive power. Alternately or additionally, controller A can identify the two channels with the highest transmitter bias currents.

Figure 10H:
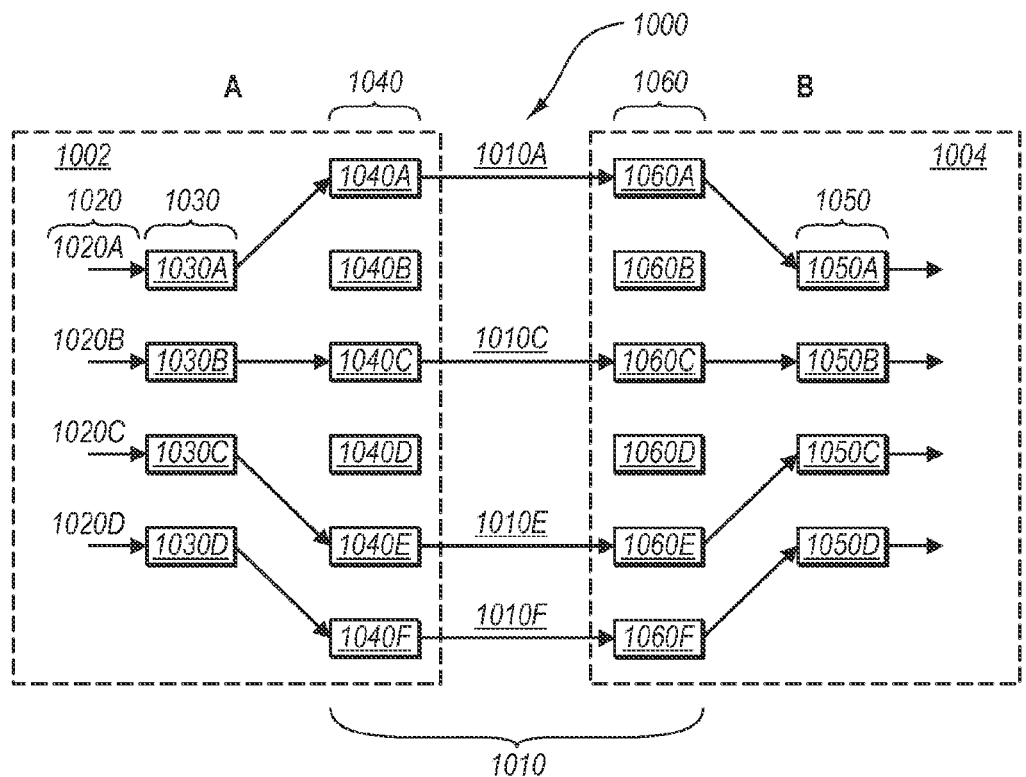

FIG. 10H illustrates a configuration wherein channels 1010B and 1010D have been identified as the two worst channels and switched out. In one embodiment, controller B identifies channels 1010B and 1010D as having the lowest receive power as determined from the receiver bias currents measured in receivers 1060B and 1060D. Once identified, controller B switches the two worst channels out by switching out the receivers 1060B and 1060D and signaling controller A to switch out the corresponding transmitters 1040B and 1040D. In another embodiment, controller A identifies channels 1010B and 1010D as the two worst channels based on transmitters 1040B and 1040D requiring the two highest transmit bias currents. Once identified, controller A switches the two worst channels out by switching out the transmitters 1040B and 1040D and signaling controller B to switch out the corresponding receivers 1060B and 1060D. One or more other criteria may be implemented by either or both controllers to identify and switch out the two worst channels. A similar automatic selection process may occur with respect to the M available physical channels in the B-to-A direction.

Those of skill in the art will recognize that variations on the method described with respect to FIGS. 9 and 10A-10H may be implemented without departing from the scope of the invention. For instance, rather than performing M iterations, the controller of an optoelectronic device may only need to perform one iteration to measure all the bias currents in the device's M receivers. Additionally, continuous monitoring and automatic switch out during main link operation is also possible, without confining the channel-selection process to occurring only during link establishment mode.

Many potential link problems cannot be identified through information that can be made available to controllers when in normal operation mode. For example, defects which cause excessive jitter can not be determined from transmitter bias currents and receiver bias currents. Some of these problems can be detected if bit error detection can be performed, which may not be possible for some device controllers. Other defects can only be detected through the use of specialized test equipment, not available in normal operation.

To improve problem detection, each of the M physical channels (in both the A-to-B and B-to-A directions) which includes all the transmitters and receivers, can be measured and evaluated at the factory, where specialized test equipment can be available. Metrics about each of the M available channels, in each direction, can be stored in each of the controllers for use during switching out of S channels to enable the best N channels to be used for the main communication links. For example, the factory measurements can permanently mark some channels as defective, so that they are never selected for main communication link use. The factory measurements can also be used to calibrate transmitter bias current and receiver bias current measurements, to permit the controller to make better automatic selection of S bad channels.

Advantageously, the present invention optimizes the performance of a multi-channel communication link with spare channels by automatically selecting the best channels for signal transmission. Additionally, the invention allows a customer to fix a failure in one of the physical channels by simply: (1) power cycling the communication system, (2) resetting the link hardware, or (3) unplugging and plugging in the hardware link. Because of the high reliability of the status link, it can be relied on to actively switch on the best available channels for the optical communication link.

Figure 11:
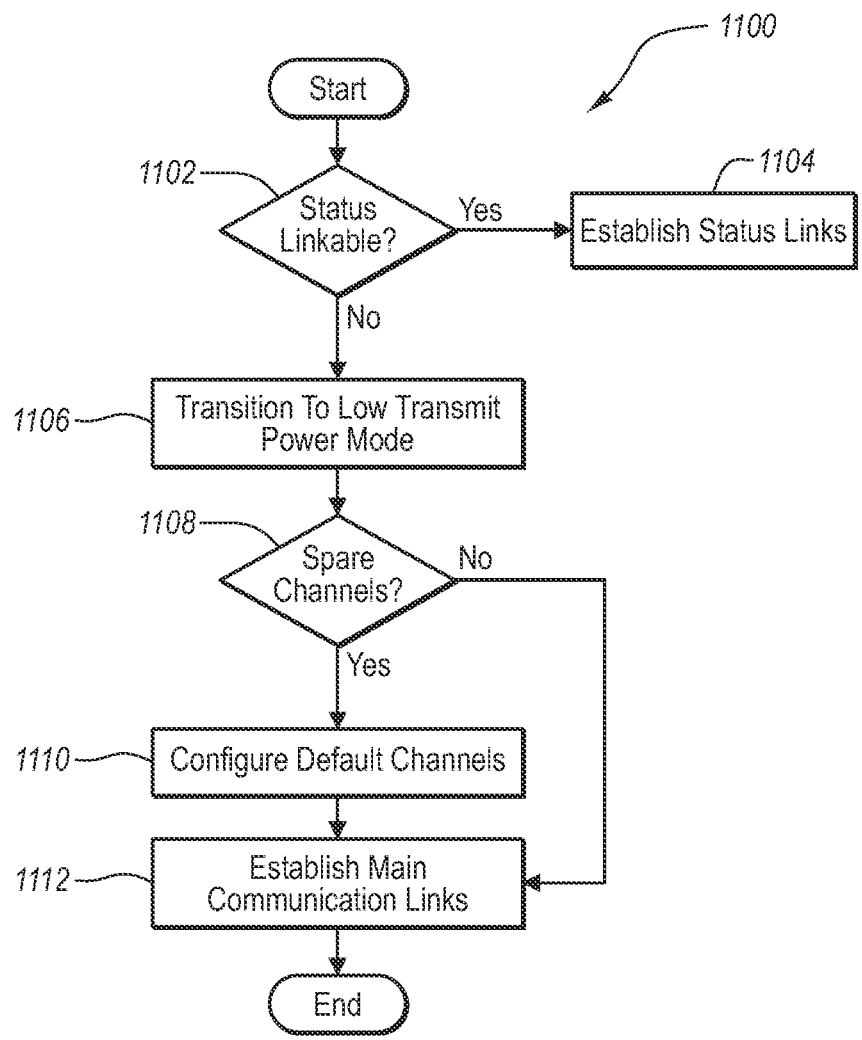
FIG. 11 depicts a method for interoperating a status-link enabled device with a non-status-link enabled device.
Figure 12:
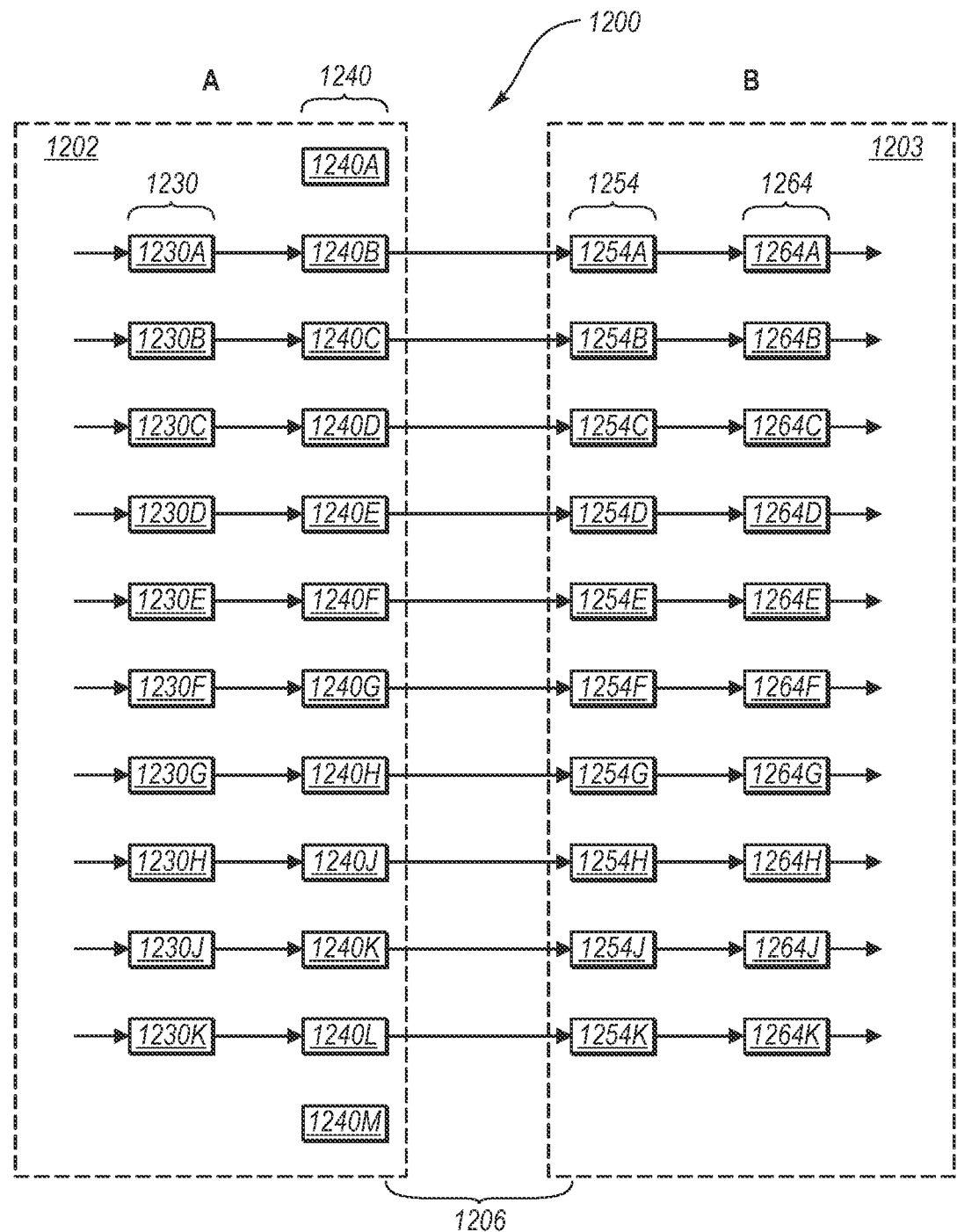
FIG. 12 illustrates a status-link enabled device having spare channels interoperating with a non-status-link enabled device.

According to another embodiment of the invention, a status-link enabled device can interoperate with a non-status-link enabled device, as described with respect to FIGS. 1, 11 and 12. In particular, FIG. 11 illustrates one embodiment of a method 1100 for interoperating a status-link enabled device with a non-status-link enabled device. The process 1100 begins after optoelectronic device A 110 and optoelectronic device B 120 are communicably coupled. In the present embodiment, device A 110 is status-link enabled while device B 120 is not. Additionally, device A 110 includes one or more (S) spare channels while device B does not have any spare channels.

The process 1100 begins when device A 110 determines 1102 whether device B 120 is also status-link enabled, which may be accomplished in any of a number of ways. For instance, if device B 120 attempts to establish a main communication link with status-link enabled device A 110 without establishing a status link, device A 110 may determine that device B 120 is not status-link enabled. Alternately, device A may attempt to establish a status link with device B, asking device B to establish a status link with device A as acknowledgment. In this case, device A may then wait for an acknowledgment from device B for a specified time, which could be enforced by a countdown timer of device A. If device A 110 does not receive an acknowledgment within the prescribed time, it may determine that device B is not status-link enabled.

If device A 110 determines 1102 that device B is also status-link enabled, the two devices can establish 1104 a status link with each other and perform status-link enabled functions, such as switching out channels as already described above. Alternately or additionally, the status link can be used to adjust transmit power, transition to a low transmit power mode to preserve eye safety during potential optical signal exposure, and the like or any combination thereof.

However, if device A 110 determines 1102 that device B 120 is not status-link enabled, device A transitions 1106 to or maintains operation in a low transmit power mode. To preserve eye safety, conventional optoelectronic devices are typically configured to operate below a maximum eye safety threshold such that if and when emitted optical signals are exposed to view, the viewer's eyes are not damaged. When two status-link enabled devices are used together in a multi-channel communication link, potential exposure of optical signals can be detected, permitting the devices to operate in a normal transmit power mode above the maximum eye safety threshold, which increases the reach and quality of emitted optical signals. In this case, if optical signals are potentially exposed to view, the two status-link enabled devices can switch to a low transmit power mode which is below the maximum eye safety limit.

When device A 110 is status-link enabled and used with non-status-link enabled device B 120 in a duplex multi-channel communication link, potential exposure of optical signals cannot be detected in both directions of the link. Thus, both devices must operate at or below the maximum eye safety threshold at all times to preserve eye safety. For this reason, when status-link enabled device A 110 determines that it is communicating with non-status-link enabled device B 120, it transitions 1106 to the low transmit power mode. Alternately, device A 110 may already be in the low transmit power mode, in which case it maintains 1106 operation in the low transmit power mode. Typically, the low transmit power mode is set at a maximum possible value which preserves eye safety while permitting operation of the main communication links, although with potentially lower performance than if the normal transmit power mode is used. In one embodiment, the low transmit power mode is achieved by reducing the transmitter bias currents supplied to the N active transmitters of device A 110.

After transitioning to the low transmit power mode, status-link enabled device A 110 determines 1108 whether it has spare channels. This information may be programmed into the controller of device A 110 or may be ascertained by comparing the number N of active channels to the number M of available channels. If device A 110 determines that it does not have any spare channels, it can establish 1112 main communication links with non-status-link enabled device B 120 in the low transmit power mode. If device A 110 determines that it has spare channels, it configures 1110 itself to emit optical signals over default transmit channels and receive optical signals over default receive channels, the default channels being defined for main communication link operation in the absence of a status link. Default channels are described in more detail with respect to FIG. 12. Once device A 110 is appropriately configured to transmit and receive over default transmit and receive channels, it can establish 1112 main communication links with the non-status-link enabled device in the low transmit power mode.

With additional reference to FIG. 12, a multi-channel communication link 1200 is illustrated between a status-link enabled device A 1202 and a non-status-link enabled device B 1203. Device A 1202 is optically coupled to device B 1203 in the A-to-B direction via an optical medium 1206. Additionally, device B 1203 may be optically coupled to device A 1202 in the B-to-A direction via a different optical medium (not shown). According to one embodiment, the link 1200 is capable of transmitting ten (N) by 10 G channels from device A 1202 to device B 1203. Although not shown, the link 1200 may additionally be capable of transmitting ten (N) by 10 G channels from device B 1203 to device A 1202 in the B-to-A direction. Thus, the link 1200 is configured for 100 G communication speeds in both the A-to-B and B-to-A directions.

In one embodiment, the optical medium 1206 may comprise MPO 12 fiber patch cord for transmitting ten optical signals from status-link enabled device A 1202 to non-status-link enabled device B 1203. In a conventional arrangement, the ten center fibers are defined for establishing ten by 10 G main communication links. More generally, the optical medium 1206 may comprise M ribbon fibers for transmitting N optical signals where N default fibers are defined for establishing N main communication links. More generally still, for M available communication channels, N of the M available channels may be defined as default channels.

Status-link enabled device A 1202 of FIG. 12 is similar, and may be identical, to the device 602 of FIG. 6. In particular, status-link enabled device A 1202 comprises ten (N) 3:1 ((S+1):1) demuxes 1230 (comprising demuxes 1230A-1230K) which can route ten input electrical signals 1220 (comprising signals 1220A-1220K) to any ten (N) active of twelve (M) available transmitters 1240 (comprising transmitters 1240A-1240M). The link 1200 has two (S) spare channels (e.g., transmitters 1240A and 1240M in the embodiment of FIG. 12). The ten active transmitters emit optical signals onto ten of the twelve fibers 1206.

Non-status-link enabled device B 1203 of FIG. 12 lacks spare receive channels. It has ten (N) receivers 1254 (comprising receivers 1254A-1254K) for receiving the ten signals from status-link enabled device A 1202. The ten receivers 1254 transform the received optical signals into electrical signals and may provide the electrical signals to ten post-amplifiers 1264 (comprising post-amplifiers 1264A-1264K).

For the status-link enabled device 1202 having spare channels to interoperate with the non-status-link enabled device 1203, the status-link enabled device 1202 configures its ten demuxes 1230 to route their output to the ten center transmitters 1240B-1240L, corresponding to the ten center fibers of the twelve fibers 1206. Although not shown, status-link enabled device A 1202 also configures ten muxes to receive electrical signals from ten center receivers. More generally, however, interoperation requires that a status-link enabled device with N demuxes and M available transmitters configure its N demuxes to route their input signals to the N transmitters corresponding to the N default transmit channels defined for the type of communication in question. Additionally, interoperation requires that a status-link enabled device with N muxes and M available receivers configure its N muxes to receive electrical signals from N receivers corresponding to N default receive channels.

Advantageously, embodiments of the present invention permit a status-link enabled device to establish main communication links with a non-status-link enabled device by transitioning to a low transmit power mode and, when it has spare channels, configuring itself to transmit and receive over default transmit and receive channels. Although the benefits of having a status link are not available, a status-link enabled device has the added capability of interoperability.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic device comprising:
    a plurality of optical transmitters configured to emit a plurality of transmit optical signals representative of a plurality of transmit electrical signals, each of the plurality of transmit optical signals including primary data, and the plurality of optical transmitters including a plurality of default optical transmitters;
    a plurality of optical receivers configured to receive a plurality of receive optical signals and generate a plurality of receive electrical signals, each of the plurality of receive optical signals including primary data; and
    a controller configured to determine whether a remote device to which the optoelectronic device is communicatively coupled is status-link enabled, and:
        when the remote device is status-link enabled:
            effectively modulate transmitter bias currents for at least two of the optical transmitters with a low frequency status link signal such that first status data is simultaneously conveyed with primary data on at least two of the plurality of transmit optical signals; and
            detect second status data simultaneously received with primary data on at least two of the plurality of receive optical signals; or when the remote device is not status-link enabled:
            transition the optoelectronic device to or maintain operation in a low transmit power mode; and
            transmit the plurality of transmit optical signals including primary data to the remote device using the plurality of default optical transmitters.

2. The optoelectronic device of claim 1, wherein:
    the plurality of optical transmitters includes: the plurality of default optical transmitters equal in number to the plurality of transmit optical signals, also being equal in number to the plurality of transmit electrical signals, and one or more spare optical transmitters; and
    the plurality of optical receivers includes: a plurality of default optical receivers equal in number to the plurality of receive optical signals, also being equal in number to the plurality of receive electrical signals, and one or more spare optical receivers.

3. The optoelectronic device of claim 2, further comprising:
    a plurality of demultiplexers configured to route the plurality of transmit electrical signals from a corresponding number of electrical inputs to a corresponding number of the plurality of optical transmitters, leaving one or more unused optical transmitters; and
    a plurality of multiplexers configured to route the plurality of receive electrical signals from a corresponding number of the plurality of optical receivers to a corresponding number of electrical outputs, leaving one or more unused optical receivers.

4. The optoelectronic device of claim 3, wherein when the remote device is not status-link enabled, the remote device includes the same number of optical receivers as transmit optical signals for receiving the transmit optical signals and the same number of optical transmitters as receive optical signals for generating the receive optical signals.

5. The optoelectronic device of claim 4, wherein when the remote device is not status-link enabled, the controller is further configured to:
    configure the demultiplexers to route the plurality of transmit electrical signals through the plurality of default optical transmitters, the plurality of default optical transmitters being communicably coupled to the optical receivers of the remote device; and
    configure the multiplexers to route the plurality of receive electrical signals from the plurality of default optical receivers, the plurality of default optical receivers being communicably coupled to the optical transmitters of the remote device.

6. The optoelectronic device of claim 3, wherein when the remote device is status-link enabled, the remote devices includes a plurality of optical receivers equal in number to the number of the optoelectronic device's plurality of optical transmitters, and a plurality of optical transmitters equal in number to the number of the optoelectronic device's plurality of optical receivers, and wherein the optoelectronic device is configured to switch out one or more of its optical transmitters, optical receivers, or both, and the remote device is configured to switch out one or more of its optical transmitters, optical receivers, or both.

7. A method of interoperating a status-link enabled device with a non-status-link enabled device, the method comprising:
    in a multi-channel status-link enabled optoelectronic device including a plurality of default transmit channels and one or more spare transmit channels and being communicably coupled to a remote device, determining, by the status-link enabled optoelectronic device, that the remote device is not status-link enabled, wherein the determining that the remote device is not status-link enabled includes one or more of transmitting an acknowledgment request to the remote device using a status link and not receiving acknowledgment from the remote device within a prescribed time period, and the remote device establishing main communication links but not a status link with the status-link enabled optoelectronic device over a plurality of receive channels of the status-link enabled optoelectronic device;
    transitioning to or maintaining operation in a low transmit power mode in the optoelectronic device; and
    establishing, on each of the plurality of default transmit channels, one main communication link of a plurality of main communication links with the remote device, the plurality of main communication links including primary data.

8. The method of claim 7, wherein the low transmit power mode includes sufficient link budget to establish the plurality of main communication links on the plurality of default transmit channels, while the total transmit power of the default transmit channels remains at or below a maximum eye safety limit.

9. The method of claim 7, wherein transitioning to a low transmit power mode in the optoelectronic device includes reducing transmitter bias currents supplied to the default transmit channels.

10. The method of claim 7, wherein the default transmit channels include ten center fibers of a twelve fiber patch cord.

11. The method of claim 7, wherein the optoelectronic device further includes a plurality of default receive channels and one or more spare receive channels, and wherein the remote device establishes a plurality of main communication links with the optoelectronic device on the plurality of default receive channels.

12. The method of claim 7, wherein the primary data included in the plurality of main communication links comprises customer data.

13. The method of claim 7, wherein the primary data included in the plurality of main communication links comprises voice data.

14. The method of claim 7, wherein the primary data included in the plurality of main communication links comprises computer data.

* * * * *